(12) United States Patent
Castorina et al.

(10) Patent No.: US 8,570,386 B2
(45) Date of Patent: Oct. 29, 2013

(54) METHOD OF MERGING IMAGES AND RELATIVE METHOD OF GENERATING AN OUTPUT IMAGE OF ENHANCED QUALITY

(75) Inventors: Alfio Castorina, Linera (IT); Giuseppe Spampinato, Catania (IT); Alessandro Capra, Gravina di Catania (IT); Arcangelo Ranieri Bruna, San Cataldo (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 471 days.

(21) Appl. No.: 12/319,001

(22) Filed: Dec. 31, 2008

(65) Prior Publication Data

US 2010/0165122 A1    Jul. 1, 2010

(51) Int. Cl.
*H04N 5/228* (2006.01)

(52) U.S. Cl.
USPC ................................ 348/208.99; 348/208.1

(58) Field of Classification Search
USPC ........................................ 348/208.99, 208.1
See application file for complete search history.

(56) References Cited

U.S. PATENT DOCUMENTS

| | | | |
|---|---|---|---|
| 6,778,210 B1* | 8/2004 | Sugahara et al. | 348/208.4 |
| 7,529,474 B2* | 5/2009 | Hatanaka et al. | 396/52 |
| 7,990,428 B2* | 8/2011 | Yano et al. | 348/222.1 |
| 8,063,995 B2* | 11/2011 | Xu et al. | 348/701 |
| 2004/0119861 A1 | 6/2004 | Bosco et al. | |
| 2008/0170126 A1* | 7/2008 | Tico et al. | 348/208.6 |
| 2008/0259170 A1* | 10/2008 | Hatanaka | 348/208.6 |
| 2008/0266406 A1* | 10/2008 | McLeod et al. | 348/208.16 |
| 2009/0150306 A1 | 6/2009 | Campbell | 705/500 |
| 2009/0278945 A1* | 11/2009 | Lin | 348/208.1 |
| 2010/0302383 A1* | 12/2010 | Fuh et al. | 348/208.4 |

OTHER PUBLICATIONS

Bella, "Tecniche di stabilizzazione attraverso l'analisi di similarità tra time series," Tesi Corso di Laurea in Informatica, Università degli studi di Catania, pp. 1-120, 2005.
Ben-Ezra et al., "Motion Deblurring Using Hybrid Imaging," IEEE Conference on Computer Vision and Pattern Recognition, pp. 1-8, 2003.
Bosco et al., "Adaptive Temporal Filtering for CFA Video Sequences," Proceedings of ACIVS (Advanced Concepts for Intelligent Vision Systems), Ghent, Belgium, Sep. 2002, pp. 19-24.
Bosco et al., "A Temporal Noise Reduction Filter Based on Image Sensor Full-Frame Data," Proceedings of IEEE (International Conference on Consumer Electronics), Los Angeles, California, pp. 402-403, Jun. 2003.
Choi et al., "New auto focusing technique using the frequency selective weighted median filter for video cameras," IEEE Transactions on Consumer Electronics, 45(3):820-827, Aug. 1999.
Engelsberg et al., "A comparative review of digital image stabilizing algorithms for mobile video communications," IEEE Transactions on Consumer Electronics, 45(3):591-597, Aug. 1999.

(Continued)

*Primary Examiner* — Anthony J Daniels
(74) *Attorney, Agent, or Firm* — Seed IP Law Group PLLC

(57) ABSTRACT

A method of processing and device configure to process digital images to enhance image quality and correct motion blur. A number N of images of a scene are captured with an exposure time T. An order of sharpness of the images is determined and the sharpest image is used as a reference image for generating an output image.

20 Claims, 44 Drawing Sheets

(56) References Cited

OTHER PUBLICATIONS

Gonzeles et al., "Digital Image Processing, 2nd Edition," Prentice Hall Publishing, 2002.
Koo et al., "An Image Resolution Enhancing Technique Using Adaptive Sub-Pixel Interpolation for Digital Still Camera System," IEEE Transactions on Consumer Electronics, 45(1):118-123, Feb. 1999.
Liu et al., "Simultaneous Image Formation and Motion Blur Restoration Via Multiple Capture," International Conference on Acoustics, Speech, and Signal Processing, pp. 1841-1844, 2001.
Liu et al., "Synthesis of High Dynamic Range Motion Blur Free Image From Multiple Captures," IEEE Transactions on Circuits and Systems I: Fundamental Theory and Applications, 50(4):530-539, Apr. 2003.
Rav-Acha et al., "Restoration of Multiple Images with Motion Blur in Different Directions," IEEE Proceedings of the 5th Workshop on Applications of Computer Vision, pp. 22-27, 2000.
Vella et al., "Digital Image Stabilization by Adaptive Block Motion Vectors Filtering," IEEE Transactions on Consumer Electronics, 48(3)196-801, Aug. 2002.
Wei et al., "Digital Image Restoration by Exposure-Splitting and Registration," Proceedings of the 17th International Conference on Pattern Recognition, 2004, 4 pages.
Gonzales et al, "Digital Image Processing, 2nd Edition," Prentice Hall Publishing, 2002.

* cited by examiner

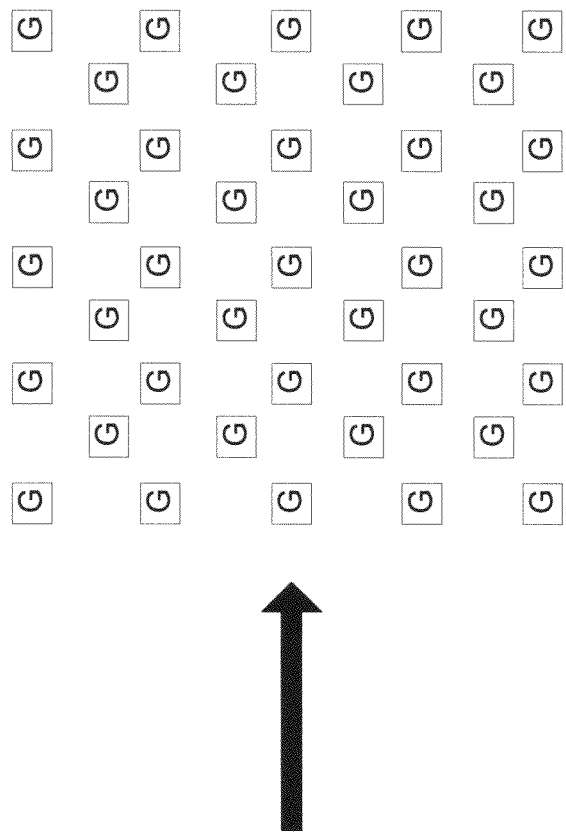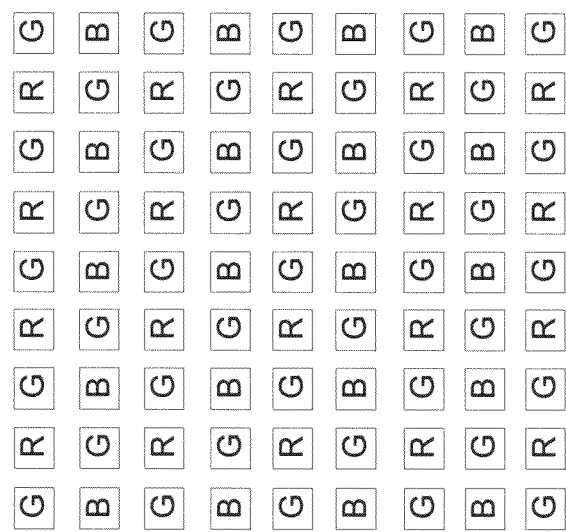
Fig. 5

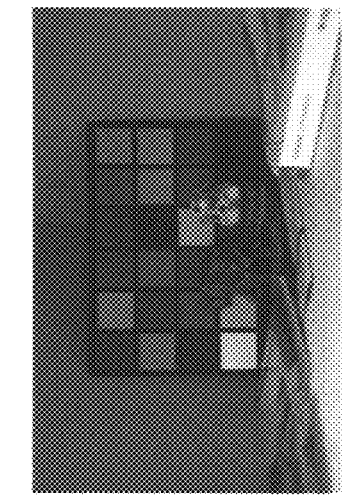
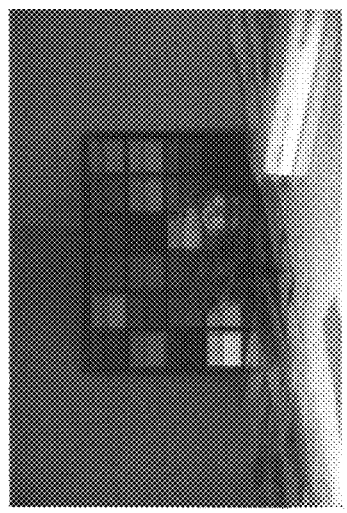
Fig. 13

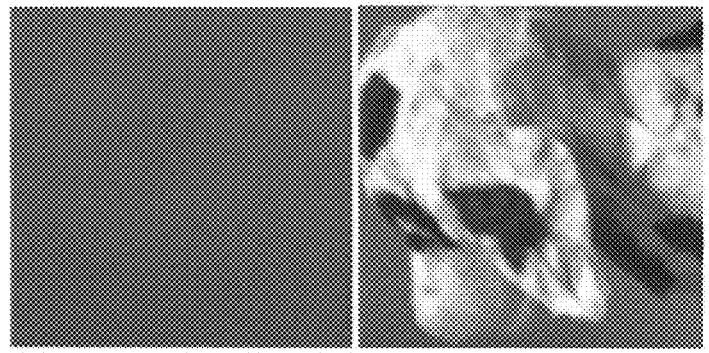
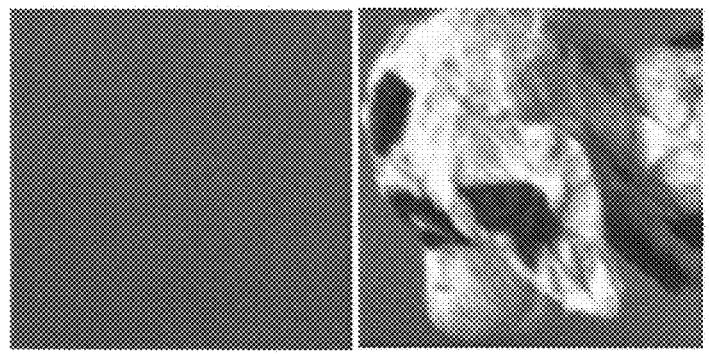
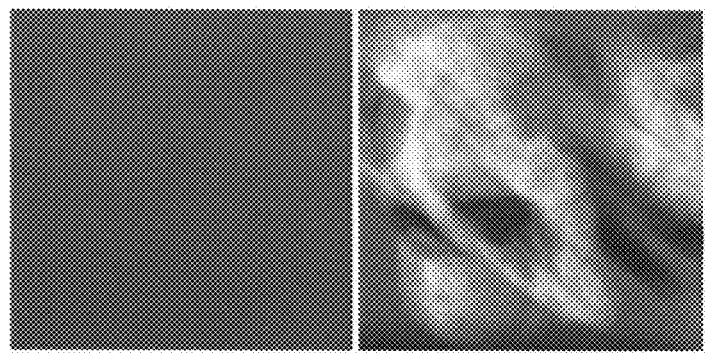
Fig. 30

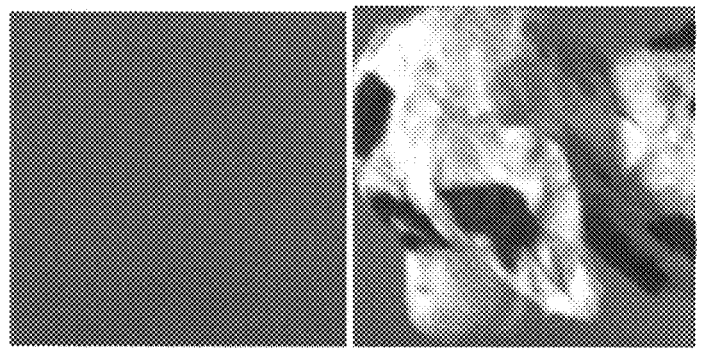
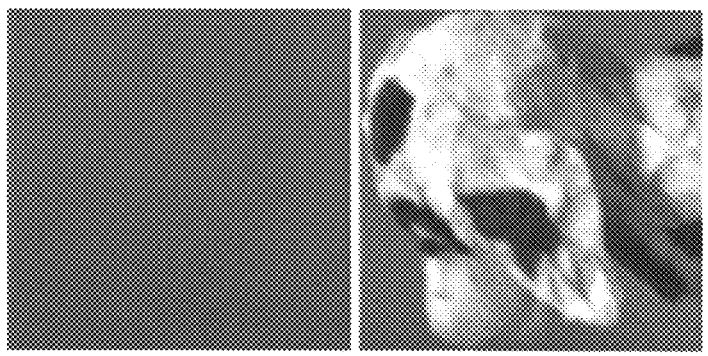
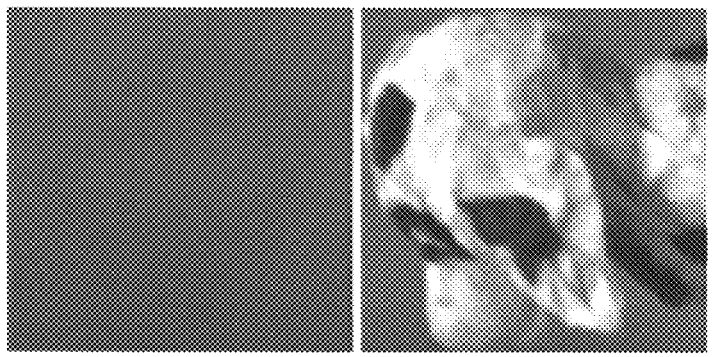
Fig. 31

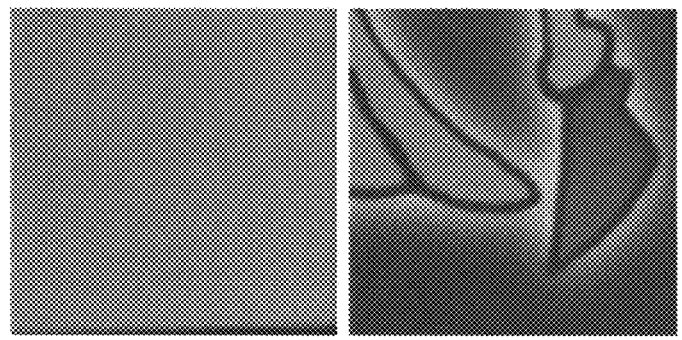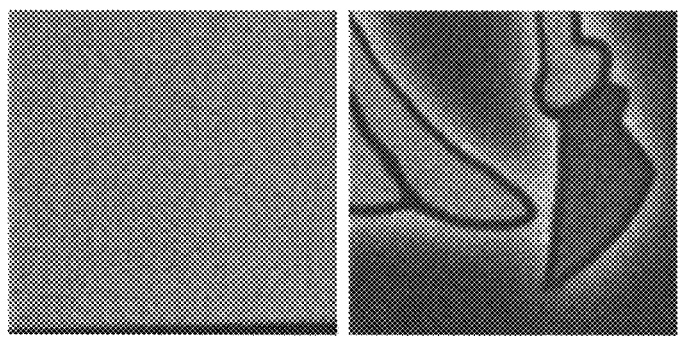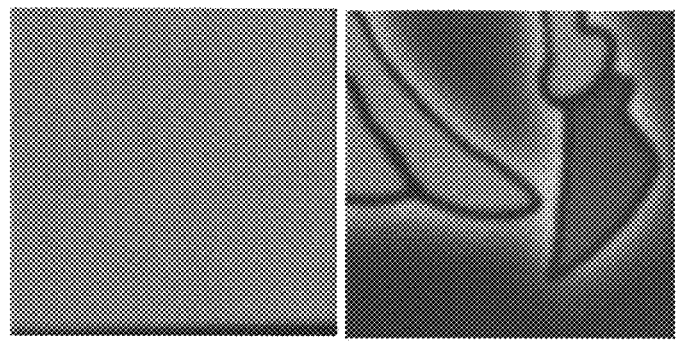
Fig. 32

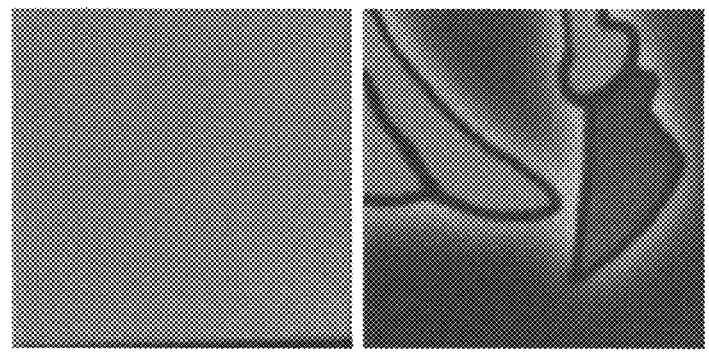
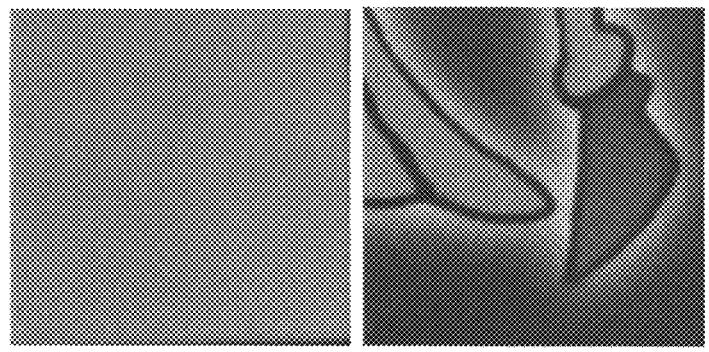
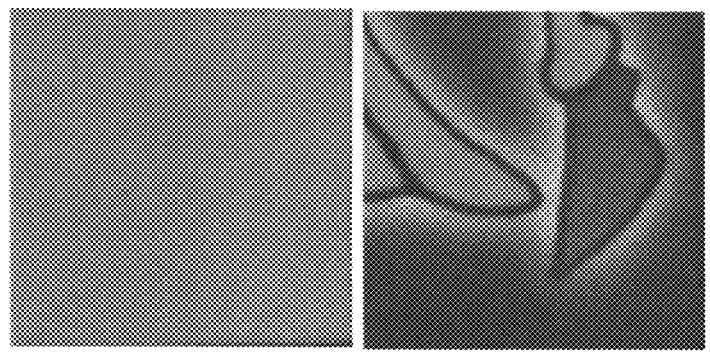
Fig. 33

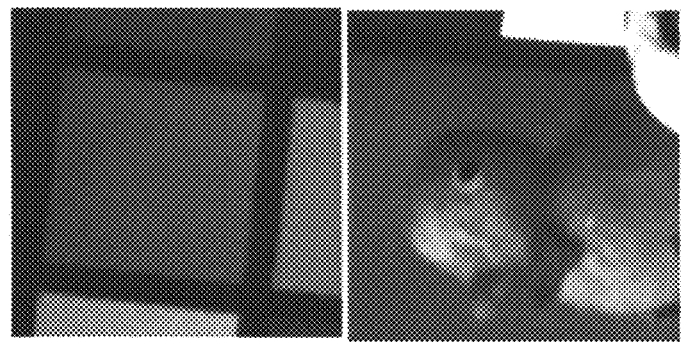
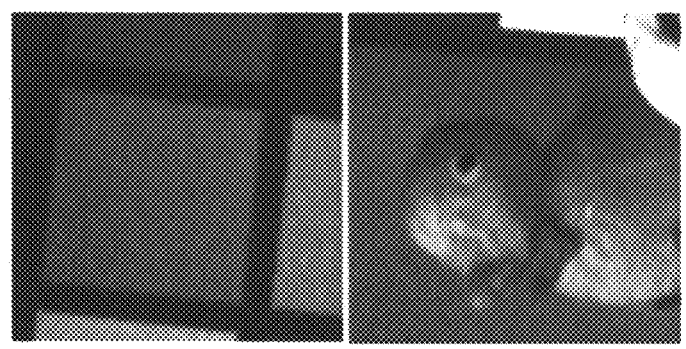
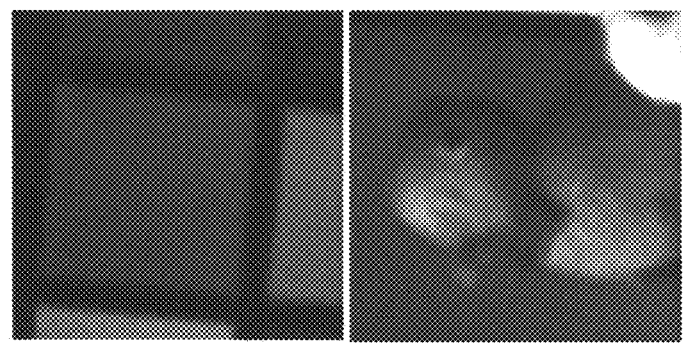
Fig. 34

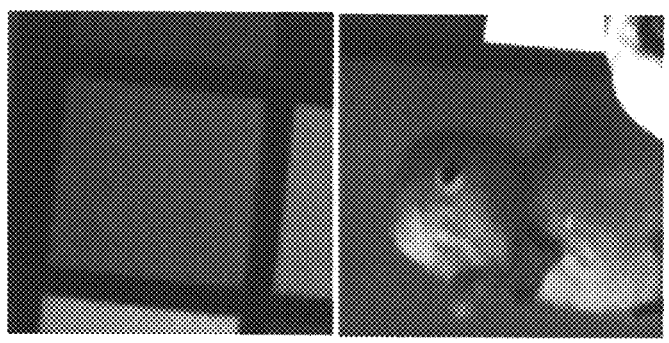
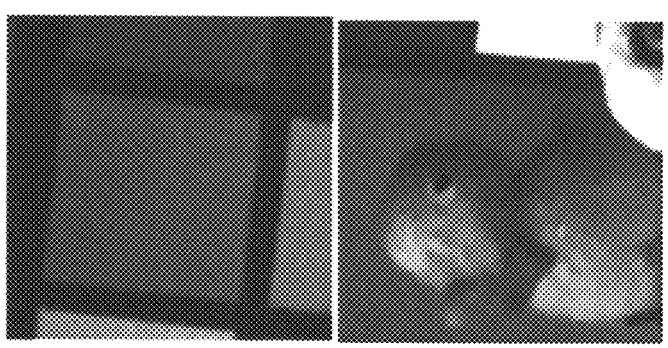
Fig. 35

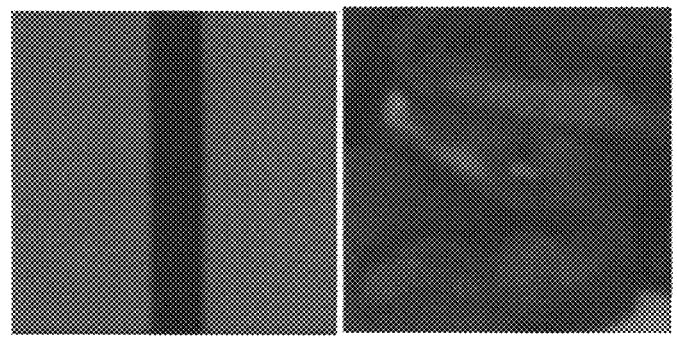
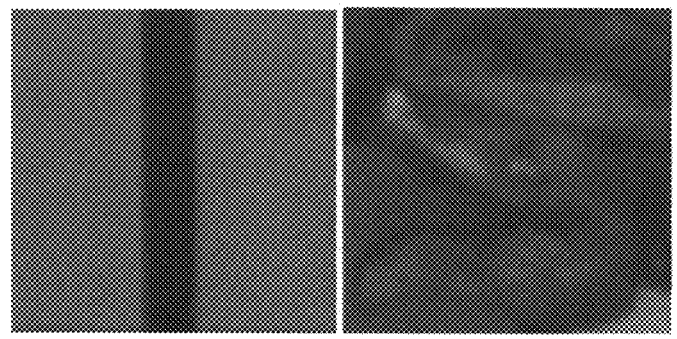
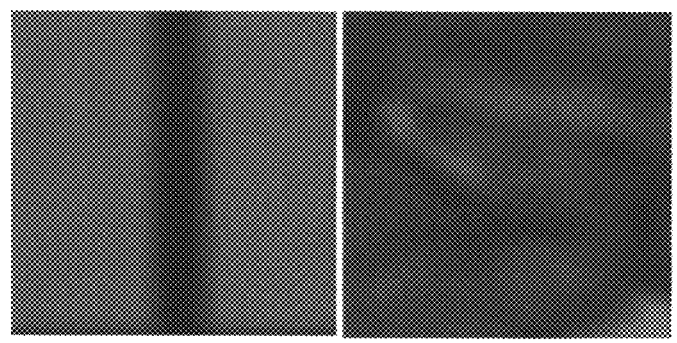
Fig. 36

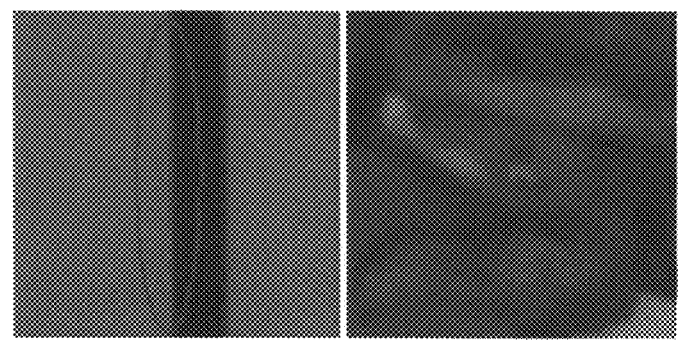
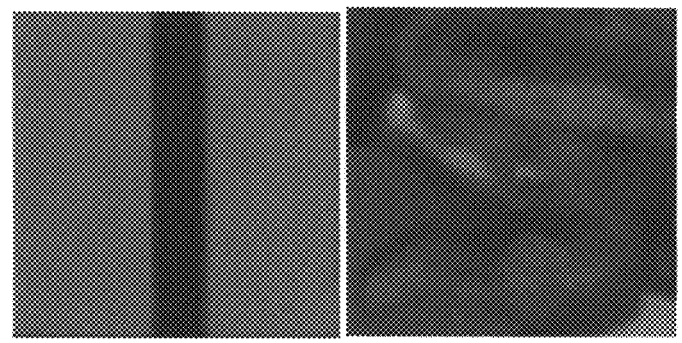
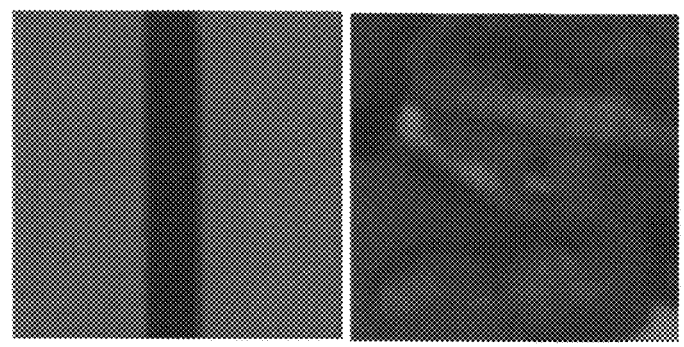
Fig. 37

METHOD OF MERGING IMAGES AND RELATIVE METHOD OF GENERATING AN OUTPUT IMAGE OF ENHANCED QUALITY

BACKGROUND

1. Technical Field

This disclosure relates to systems to and methods of processing digital images and more particularly to systems to and methods of generating an output image of enhanced quality and related systems and methods for correcting motion blur.

2. Description of the Related Art

Despite the great advances that have been made in the field of digital photography and CMOS/CCD sensors, several sources of distortion continue to be responsible for image quality degradation, among them noise and motion blur. See X. Liu and A. El Gamal, "Synthesis Of High Dynamic Range Motion Blur Free Image From Multiple Captures", *IEEE Transactions On Circuits And Systems*, vol. 50, no. 4, April 2003. When an image is captured by a CMOS sensor, noise can be expressed as the sum of three kinds of noise sources, each of them related to the integration time T:

1. shot noise, S(T);
2. read out noise (inclusive of quantization noise), R(T);
3. reset noise, Z(T).

The collected charge C(T) is given (in a very simplified model, which does not take into account another common distortion of CMOS sensors, known as Fixed Pattern Noise (FPN)) by:

$$C(T) = \int_0^T (ph(t) + dc(t))\,dt + R(T) + Z(T) \quad (1)$$

wherein ph(t) and dc(t) are respectively the photocurrent and the dark current (current leakage produced independently from the presence of light). By supposing that the photocurrent is constant over the integration (exposure) time T, the Signal To Noise Ratio (SNR) can be expressed as:

$$snr = 20\log_{10} \frac{ph \cdot T}{(ph + dc) \cdot T + \sigma_R^2 + \sigma_Z^2} \quad (2)$$

From equation (2), an increase in the photocurrent or of the time T generally results in a SNR increase. Thus, longer exposure times usually lead to better image quality. On the other hand, a change in the photocurrent over time, due to motion, may lead to motion blur effects. In fact, in the presence of motion, the image formation process can be expressed as:

$$C = R \otimes M + N \quad (3)$$

wherein C is the image output at the camera side, R is the real scene, M is a transform matrix incorporating motion blur effects, ⊗ is the convolution operator and N is total sensor noise. This behavior is illustrated in FIG. 1, that depicts a short exposed image, free of motion blur, but relatively strongly corrupted by noise, and in FIG. 2, that represents a long exposed image, without noise, but with a noticeable blur.

Several techniques have been proposed in literature to reduce motion blur: hybrid imaging (M. B. Ezra and S. K. Nayar, "Motion Deblurring Using Hybrid Imaging", *IEEE Conference on Computer Vision and Pattern Recognition*, 2003), through a camera able to register its own motion during capture which is used to evaluate and invert the matrix M; minimization techniques (A. R. Acha and S. Peleg, "Restoration of Multiple Images with Motion Blur in Multiple Directions", *IEEE Proceedings of the 5th Workshop On Applications of Computer Vision*, 2000) to evaluate M from multiple blurred images; or using multiple captures, at different times and with different integration settings, to simultaneously extend dynamic range and reduce motion blur (X. Liu and A. El Gamal, "Synthesis Of High Dynamic Range Motion Blur Free Image From Multiple Captures", *IEEE Transactions On Circuits And Systems*, vol. 50, no. 4, April 2003; X. Q. Liu and A. El Gamal, "Simultaneous Image Formation and Motion Blur Restoration via Multiple Capture", *International Conference on Acoustics, Speech, and Signal Processing*, 2001). These techniques are primarily inspired by the use of multiple images, acquired at different instants, with the same integration (exposure) time for carrying out motion blur correction algorithms, while using denoising techniques to prevent excessive image quality loss, as described in Z. Wei, Y. Cao and A. R. Newton, "Digital Image Restoration By Exposure Splitting And Registration", *Proceedings Of The 17th International Conference On Pattern Recognition*, 2004. A general scheme illustrating a technique of this type is shown in FIG. 3.

According to this scheme, N shots, illustrated as Frames 1 to N, of a same scene are taken at 10. At 20, general video stabilization, they are then stabilized with a video stabilization algorithm by treating them as if they were a succession of images of a video sequence. At 30, an output image is generated by averaging the stabilized images.

Unfortunately, the quality of the digital images obtained with these techniques is not entirely satisfactory.

BRIEF SUMMARY

In one embodiment, an improved method of generating an output image of enhanced quality and with reduced motion blur has been devised. In some embodiments, an output image may be substantially unaffected by motion blur.

According to an embodiment, instead of capturing a scene with a single shot with an exposure time T, a plurality of N images of the scene are taken with an exposure time T/N and the luminance of each captured image is amplified up to assume a level of illumination corresponding to the illumination level that would have been obtained in an image taken with a single shot with the exposure time T. The amplified images are then ranked depending upon their sharpness and the sharpest image is elected as reference image. The vertical and horizontal offsets of the amplified images are determined in respect to the reference image, and the images are corrected from offsets. An output image is generated by processing the sharpest image and the corrected images with a spatial and/or temporal filtering using the sharpest image among the input images as reference image.

In one embodiment, a method of merging of N images of a scene into a single output image, comprises the steps of ranking the amplified images depending upon their sharpness and electing the sharpest image as reference image. The vertical and horizontal offsets of the amplified images being determined in respect to the reference image, and the images being corrected from offsets before processing them with a spatial and/or temporal filtering using the sharpest image among the input images as reference image.

According to an embodiment, the images are Bayer images and the horizontal and vertical offsets are calculated considering only the green pixels of the images.

In an embodiment, a method of merging N images of a same scene into a single output image in an image processing system comprises: determining an order of sharpness among the N images; determining vertical and horizontal offsets with respect to a sharpest image in the N images for other images in the N images and generating corresponding offset-free images; generating pixels of an intermediate image by combining corresponding pixels of the sharpest image and the offset-free images; and filtering noise from the intermediate image to generate the output image. In an embodiment, generating pixels of the intermediate image comprises computing a weighted average by assigning larger weights for sharper images and smaller weights for less sharp images. In an embodiment, generating pixels of the intermediate image comprises: calculating a standard deviation of noise by processing pixels of a set of the N images; for each pixel of the offset-free images, calculating a respective weight in function of a standard deviation and in function of an absolute value of a difference between an intensity of the pixel and of a respective pixel of the sharpest image; and generating each pixel of the intermediate image as a weighted average with the weights of the corresponding pixels of the offset-free images. In an embodiment, wherein the set of the N images comprises each of the N images. In an embodiment, generating pixels of the intermediate image comprises: performing temporal noise reduction iteratively applied in order starting from a sharpest offset-free image to a least sharp offset-free image. In an embodiment, the images are Bayer images and the offsets are calculated considering only green pixels.

In an embodiment, a method of generating an output image of enhanced quality with reduced motion blur having a level of illumination corresponding to a certain exposure time T, comprises: taking a plurality of N images of a same scene over an exposure time T with each image having an exposure time of T/N; amplifying a luminance of each of the images up to the level of illumination; determining an order of sharpness among the N images; determining vertical and horizontal offsets with respect to a sharpest image in the N images for other images in the N images and generating corresponding offset-free images; generating pixels of an intermediate image by combining corresponding pixels of the sharpest image and the offset-free images; and filtering noise from the intermediate image to generate the output image. In an embodiment, generating pixels of the intermediate image comprises computing a weighted average by assigning larger weights for sharper images and smaller weights for less sharp images. In an embodiment, generating pixels of the intermediate image comprises: calculating a standard deviation of noise by processing pixels of a set of the plurality of images; for each pixel of the offset-free images, calculating a respective weight in function of a standard deviation and in function of an absolute value of a difference between an intensity of the pixel and of a respective pixel of the sharpest image; and generating each pixel of the intermediate image as a weighted average with the weights of the corresponding pixels of the offset-free images. In an embodiment, generating pixels of the intermediate image comprises: performing temporal noise reduction iteratively applied in order starting from a sharpest offset-free image to a least sharp offset-free image. In an embodiment, the images are Bayer images and the offsets are calculated considering only green pixels.

In an embodiment, a device to process a set of images of a scene comprises: a sensor configured to generate the set of images of the scene; a memory configured to store the set of images and respective characteristic curves; a raster processing block configured to generate respective signals representing a noise rms value and a sharpness parameter for each image in the set; an ordering block configured to assign an order to each image in the set based on the sharpness parameters; a stabilization block configured to generate signals representing horizontal and vertical offsets for images with respect to a sharpest image in the set based on characteristic curves; and an image processing pipeline having a noise reduction block configured to generate an output image filtered from noise, and an image generation block configured to generate an RGB image corresponding to the set of images. In an embodiment, the images are Bayer images.

In an embodiment, a system to process a set of digital images comprises: a sharpness block configured to determine a sharpest image in the set of images; an image stabilization block configured to compensate for motion in the set of images using the sharpest image in the set of images as a reference; and a noise reduction block configured to reduce noise in an output image generated from the set of images. In an embodiment, the system further comprises an image sensor configured to generate the set of images. In an embodiment, the sharpness block is configured to order the set of images in decreasing order of sharpness. In an embodiment, the system further comprises a curve generator configured to generate characteristic curves for images in the set of images, wherein the stabilization block is configured to compensate for the motion based on the characteristic curves. In an embodiment, the images are Bayer images.

In an embodiment, a computer readable memory medium comprises contents that cause a computing device to implement a method of merging N images into a single output image, the method including: determining an order of sharpness among the N images; determining vertical and horizontal offsets with respect to a sharpest image in the N images for other images in the N images and generating corresponding offset-free images; generating pixels of an intermediate image by combining corresponding pixels of the sharpest image and the offset-free images; and filtering noise from the intermediate image to generate the output image. In an embodiment, the method further comprises: generating the N images by taking a plurality of N images of a same scene; and amplifying a luminance of each of the images N up to a level of illumination.

Embodiments may be implemented by a software executed by a digital image processing system, which may comprise one or more processors, such as digital signal processors, and memories.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 5 illustrates a Bayer pattern (left) and an extracted green plane (right).

FIG. 13 illustrates a mean of four input images without stabilization (left image) and a mean of four input images with stabilization (right image) (margins loss).

FIG. 30 illustrates images in a low noise condition: Left: long exposure image (1/10 sec—200 ISO); Center: short exposure image (1/40 sec—800 ISO); Right: TNR output image.

FIG. 31 illustrates images in a low noise condition: Left: recursive ARCTIC output image; Center: Weighted VAR Average output image; Right: TNR output image.

FIG. 32 illustrates images in a condition with more noise: Left: long exposure image (1/15 sec—250 ISO); Center: short exposure image (1/60 sec—1000 ISO); Right: Weighted VAR Average output image.

FIG. 33 illustrates images in a condition with more noise: Left: recursive ARCTIC output image; Center: TNR output image; Right: Weighted VAR Average output image.

FIG. 34 illustrates images in a gains application condition: Left: long exposure image (194 ms—DG 1:8—AG 4); Center: short exposure image (48:5 ms—DG 1:8—AG 16); Right: Weighted VAR Average output image.

FIG. 35 illustrates images in a gains application condition: Left: recursive ARCTIC output image; Center: TNR output image; Right: Weighted VAR Average output image.

FIG. 36 illustrates images in a non alignment condition: Left: long exposure image (1/5 sec—200 ISO); Center: short exposure image (1/20 sec—800 ISO); Right: TNR output image.

FIG. 37 illustrates images in a non alignment condition: Left: recursive ARCTIC output image; Center: TNR output image; Right: Weighted VAR Average output image.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

In order to facilitate the description of example embodiments, the ensuing description is organized in chapters.

1. Motion Blur Reduction

Figure 1:
FIG. 1 is an example of a short exposure image: 1/20 exposure time, 800 ISO.
Figure 2:
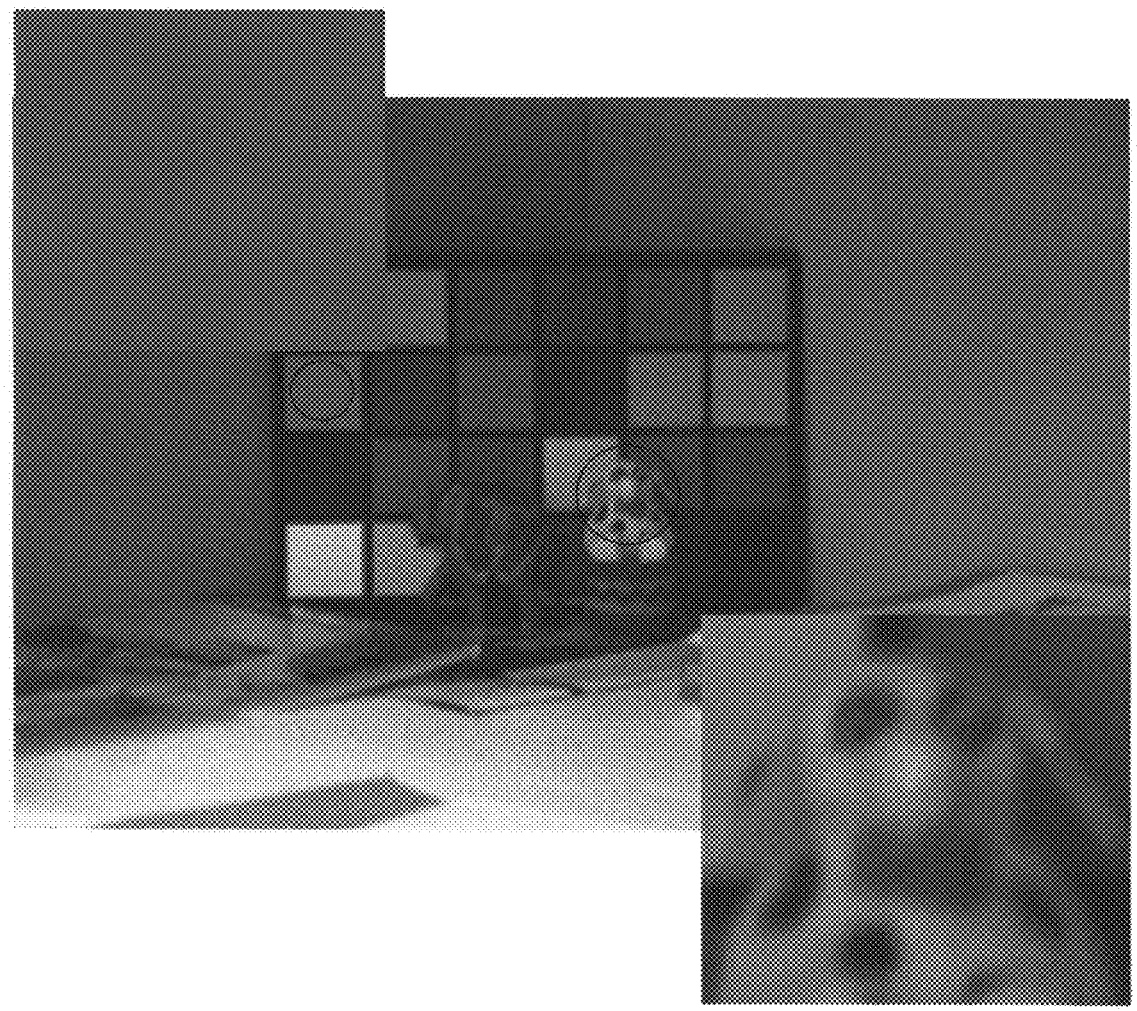
FIG. 2 is an example of a long exposure image: 1/5 exposure time, 200 ISO.
Figure 3:
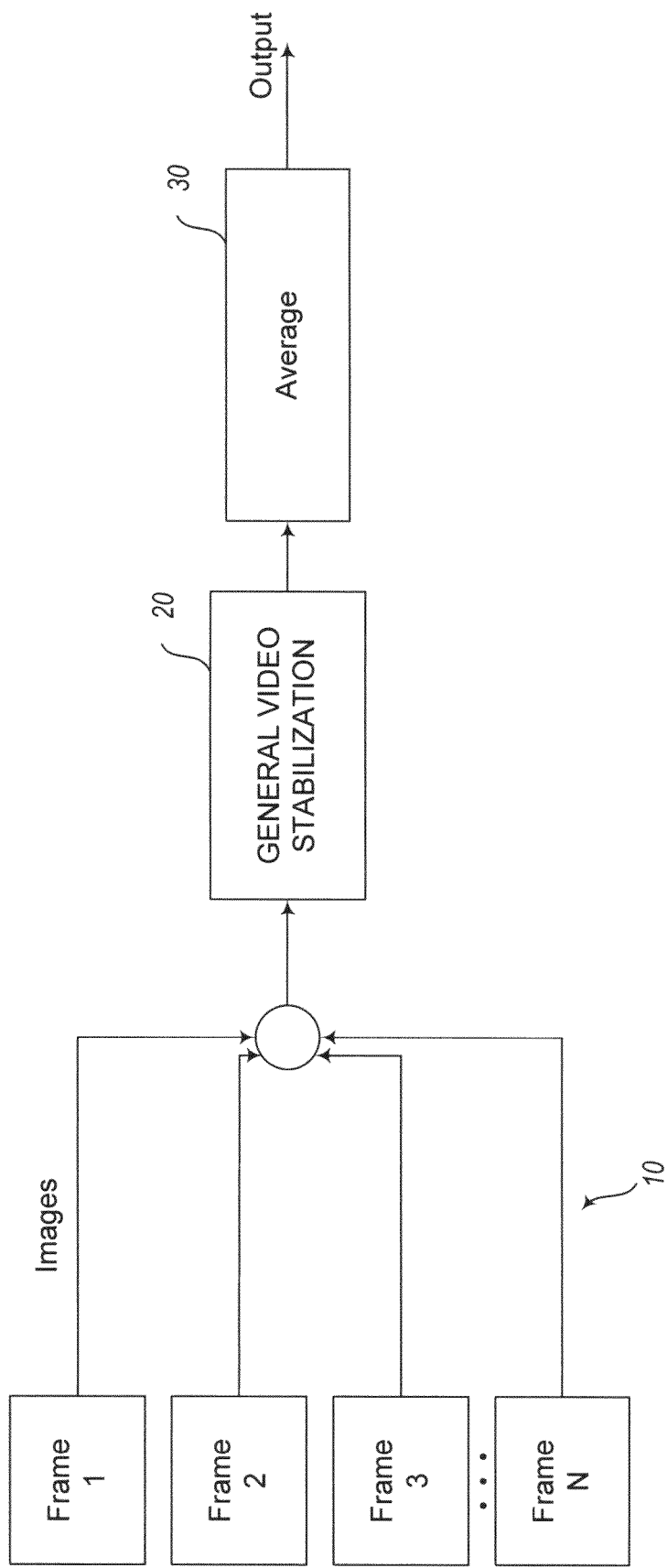
FIG. 3 illustrates generally a previous art method of addressing motion blur.
Figure 4:
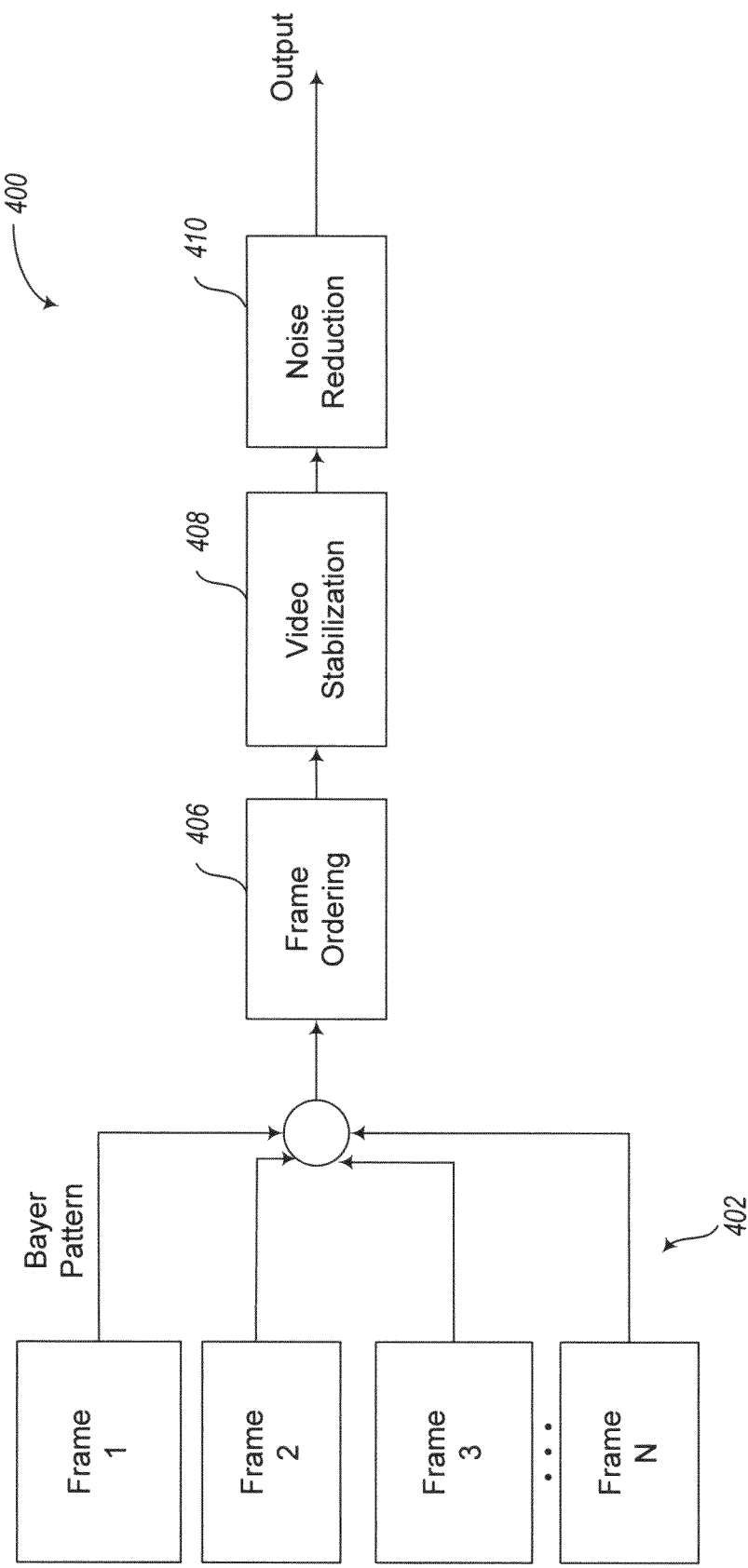
FIG. 4 illustrates an embodiment of a method of processing digital images.

An embodiment of a method 400 for generating an output image with reduced motion blur is illustrated in FIG. 4. The depicted embodiment relates to a case in which N=4 images are taken, but the method can be implemented with any number N of images. The method may comprise the following steps:
   a) Capturing at 402, N images, illustrated as image frames 1 to N, for example 4 Bayer Pattern frames with ¼ of what is considered an ideal integration time (T), in general N frames with an exposure time T/N. Such short exposed images will be subject to a quasi proportionately reduced motion blur, though they will have a quasi proportionately reduced signal-to-noise ratio.
   b) Ranking the N frames at 406 in a frame ordering step (in some embodiments, eventually only 2 of the frames to reduce the capacity of frame buffers) in decreasing sharpness order. This facilitates motion blur reduction.
   c) Stabilizing at 408 the N frames (in some embodiments, eventually only 2 of the frames to reduce computational complexity). This step facilitates SNR enhancement and may reduce halo artifacts, due, for example, to imperfect alignment.
   d) Reducing the noise at 410 of the N frames (in some embodiments, eventually only 2 of the frames to reduce computational complexity), considering the sharpest as reference frame.

1.1 Frames Reordering

In some embodiments, the noise filtering process uses a first frame as reference frame, as will be explained in Chapter 2. Ranking and reordering of the available frames according to their rank may be employed to optimize the image quality in terms of sharpness and amount of motion blur, because images of the same scene, captured under the same conditions (integration time, lens aperture, and so on) are most likely to be differently affected by unwanted motion blur. In an embodiment, a method comprises:
   1. Sharpness evaluation for each image;
   2. Image ordering in sharpness decreasing order;

Sharpness evaluation may be performed using various high-pass filters, for example Sobel and Frequency Selective Weighted Median (FSWM) filters.

According to an embodiment that will be illustrated in more detail hereinafter, both measures may be computed directly on Bayer Pattern data, using information coming from a Green channel only. Some embodiments may use information coming from one, all or various combinations of the channels. In the example embodiment, Red and Blue values are discarded as shown in FIG. 5, and as a consequence the filter computations take into the account the proper spacing of useable values.

Figure 6:
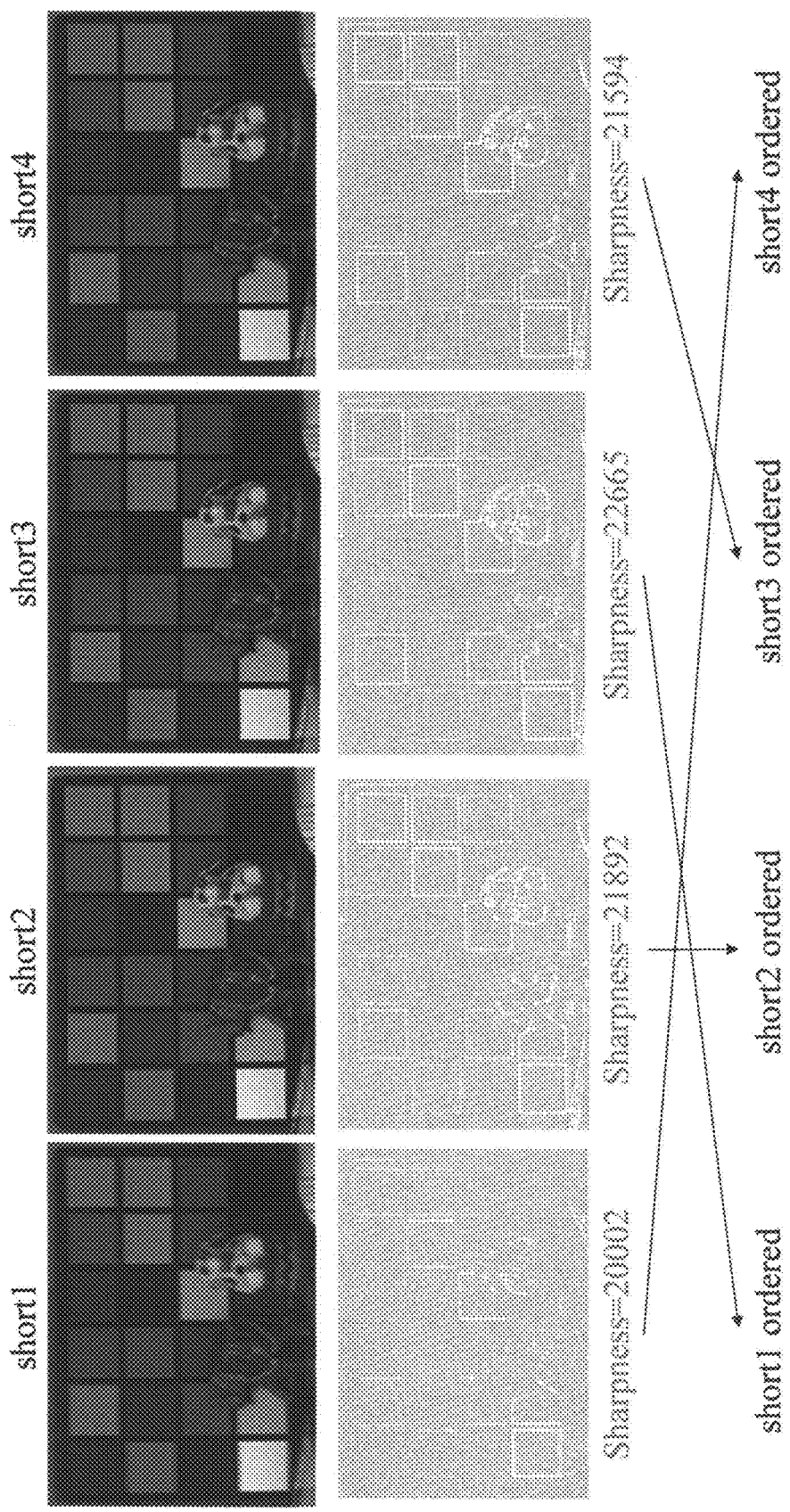
FIG. 6 illustrates an embodiment of reordering four frames using a threshold-based Sobel method. Grayscale images show points on which the Sobel was considered using a threshold $T_s=100$.
Figure 7:
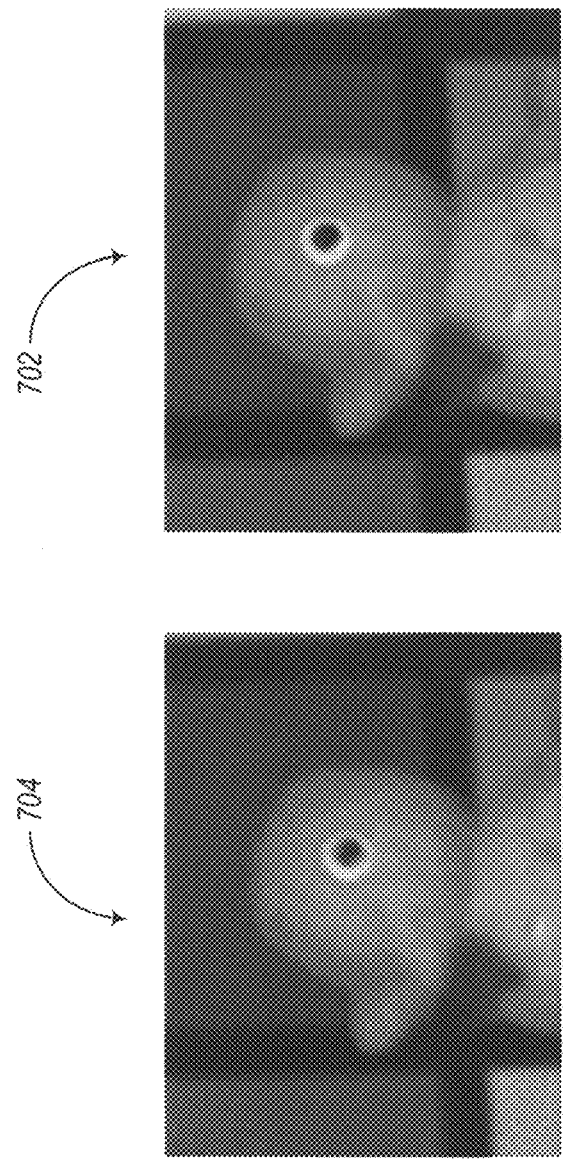
FIG. 7 illustrates an output image without (left) and with input frames sharpness re-ordering (right).

FIG. 6 shows a sequence of frames before and after re-ordering using the Sobel magnitude (with $T_S=100$) in an embodiment. FIG. 7 highlights a detail of an output image with (right 702) and without (left 704) frames reordering. The image obtained with re-ordering is visibly sharper.

1.1.1 Sobel Filter

In an example embodiment, horizontal and vertical Sobel filters (See R. C. Gonzales and R. E. Woods, "Digital Image Processing, $2^{nd}$ Edition", Prentice Hall Publishing, 2002) may be defined as:

$$Sobel_h = \begin{bmatrix} -1 & 0 & 1 \\ -2 & 0 & 2 \\ -1 & 0 & 1 \end{bmatrix} Sobel_v = \begin{bmatrix} -1 & -2 & -1 \\ 0 & 0 & 0 \\ 1 & 2 & 1 \end{bmatrix} \quad (4)$$

Sobel magnitude may be defined as:

$$Mag(i,j) = Sobel_h^2(i,j) + Sobel_v^2(i,j) \quad (5)$$

The sharpness measure may be defined as:

$$Sharpness_{Sobel} = \frac{\sum_{i=0}^{N} \sum_{j=0}^{M} Mag(i,j):Mag(i,j) > T_s}{|Mag(i,j):Mag(i,j) > T_S|} \quad (6)$$

wherein the operator |.| indicates the cardinality of its argument and $T_S$ is an optional parameter used to avoid considering extremely low values which usually correspond to noise. $T_S$ may for example be a noise threshold. The parameter Sharpness is the sum of the magnitude Mag(i,j) larger than $T_S$ divided by the cardinality of the set of values Mag(i,j) larger than $T_S$.

1.1.2 Frequency Selective Weighted Median

Figure 8:
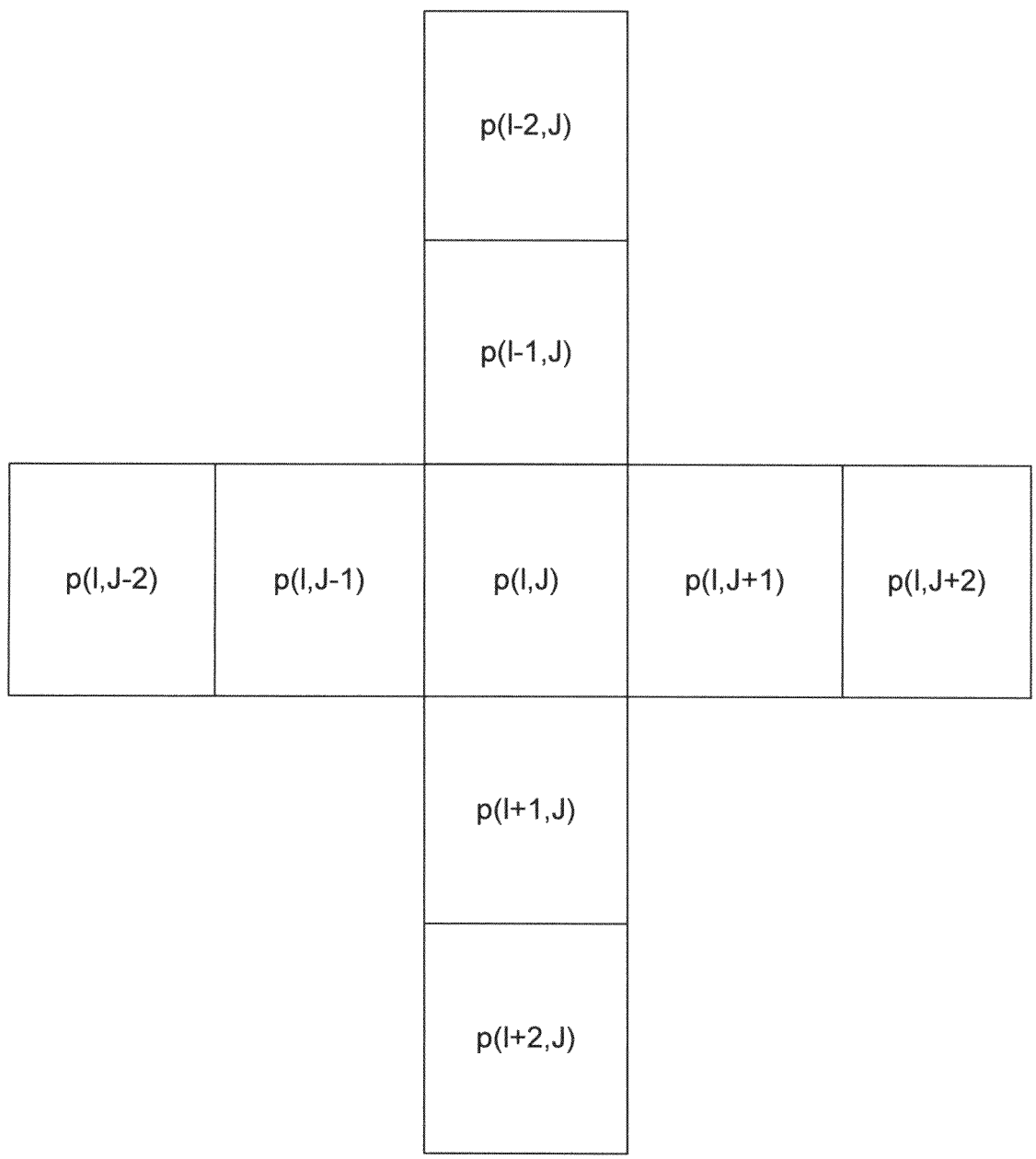
FIG. 8 illustrates a cross configuration used for FSWM computation.

In an embodiment, a frequency selective weighted median (FSWM) measure (See K. S. Choi, J. S. Lee and S. J, Ko, "New autofocusing technique using the frequency selective weighted median filter for video cameras", *IEEE Transactions On Consumer Electronics*, Vol. 45, No. 3, August 1999) uses a cross-like configuration of FIG. 8 and may be computed as follows:

Horizontal direction:

$$medh1 = median(p[i,j-2], p[i,j-1], p[i,j])$$

$$medh2 = median(p[i,j], p[i,j+1], p[i,j+2])$$

$$M1(i,j) = medh1 - medh2$$

Vertical direction:

$$medv1 = median(p[i-2,j], p[i-1,j], p[i,j])$$

$$medv2 = median(p[i,j], p[i+1,j], p[i+2,j])$$

$$M2(i,j) = medv1 - medv2$$

Thus:

$$FSWM(i,j) = M1(i,j)^2 + M2(i,j)^2 \quad (7)$$

$$Sharpness_{FSWM} = \frac{\sum_{i=0}^{N} \sum_{j=0}^{M} FSWM(i,j):FSWM(i,j) > T_F}{|FSWM(i,j):FSWM(i,j) > T_F|} \quad (8)$$

where $T_F$ is an optional parameter used to avoid considering extremely low values which usually correspond to noise. The parameter $Sharpness_{FSWM}$ is the sum of the magnitude FSWM(i,j) larger than $T_F$ divided by the cardinality of the set of values FSWM(i,j) larger than $T_F$.

1.2 Stabilization

For this step any stabilization method may be used. For example, stabilization may be carried out by executing embodiments of methods described in Chapter 5.

2. Space-Temporal Filtering

Several embodiments of space-temporal filtering methods have been implemented and tested. They are listed below, in decreasing computational complexity:
   1. Temporal Noise Reduction (TNR): the sharpest image is identified and all other images are processed using the sharpest image as a reference image;
   2. Weighted Average+Spatial Noise Reduction (WA+SNR): the weighted average is carried out attributing larger weights to the sharpest image;

3. Best Shot Selection+Recursive Spatial Noise Reduction (BS+RSNR): only the sharpest image is considered (the "best shot") and the other images may be discarded.

The first two example embodiments make use of a stabilization technique, the third example embodiment uses only the sharpest (un-stabilized) frame.

2.1 Temporal Noise Reduction (TNR).

In general, TNR uses a space-temporal support in order to perform noise reduction. See A. Bosco, M. Mancuso, S. Battiato and G. Spampinato, "Adaptive Temporal Filtering For CFA Video Sequences", *Proceedings of ACIVS*, (*Advanced Concepts for Intelligent Vision Systems*), Ghent, Belgium, September, 2002; A. Bosco, K. Findlater, S. Battiato, A. Castorina, "A Temporal Noise Reduction Filter Based On Image Sensor Full-Frame Data", *Proceedings of IEEE*, (*International Conference on Consumer Electronics*), Los Angeles, June, 2003; A. Bosco, S. Battiato, "Method for filtering the noise of a digital image sequence", U.S. patent application Ser. No. 10/648,776. The employed filter mask may be made up of pixels belonging to two successive frames. Given a noise variance estimation, the steps of TNR filtering may comprise:
 1. filter mask generation, using two successive frames;
 2. Duncan range test filtering.

Figure 14:
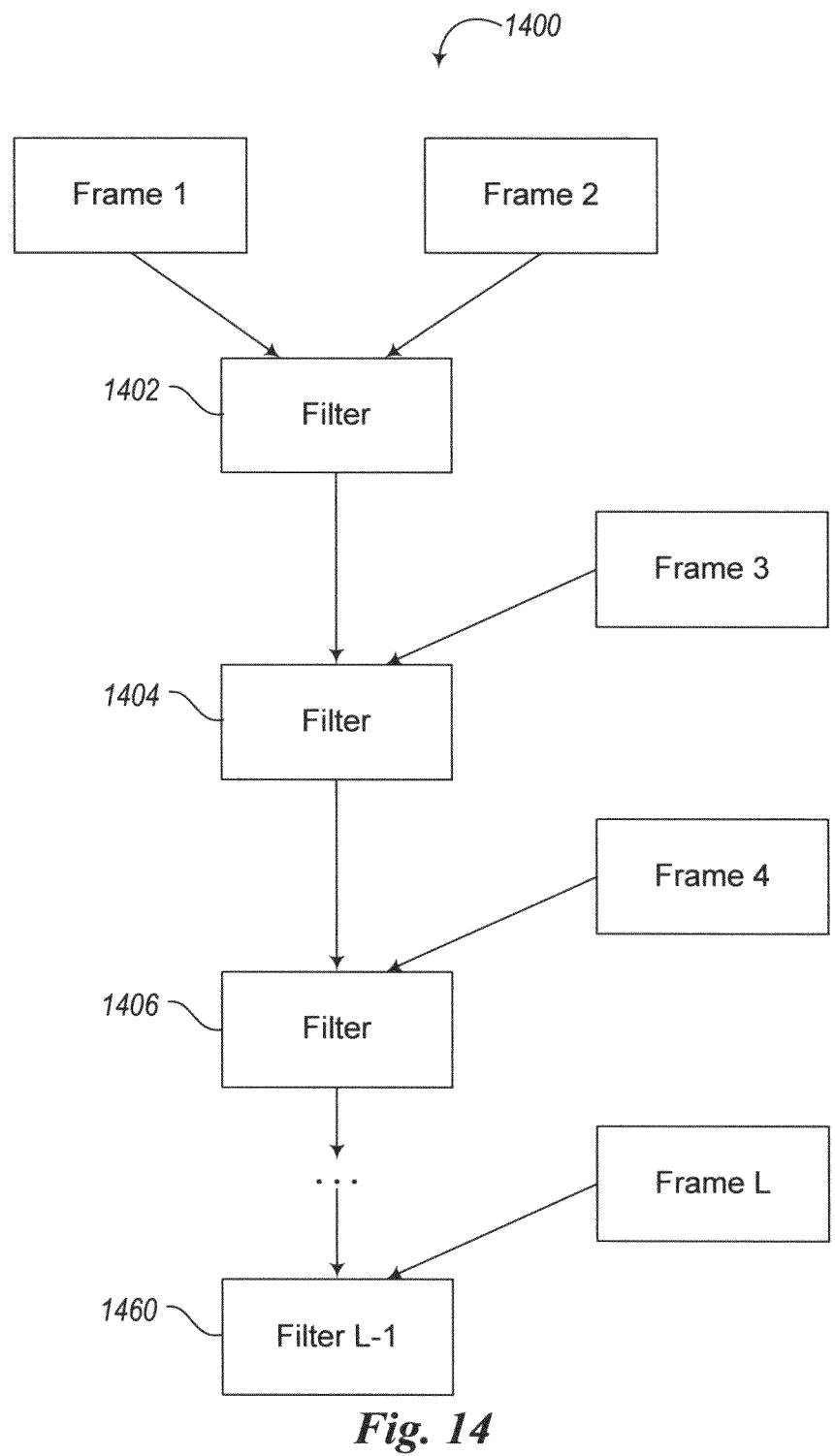
FIG. 14 illustrates an embodiment of a method of temporal noise reduction (TNR) in which the output of a filtering step becomes the previous frame for successive filtering.

The TNR filter may be modified by using the output of each filtering step as the previous frame for successive filtering. This may improve filter efficacy and increase the similarity of the output frame to the first frame (after ordering). To a certain extent, this is recursive frame filtering. An embodiment of a method 1400 using this approach is shown in FIG. 14. At least two frames are used. At 1402, a first filtering step occurs with frame 1 treated as the previous frame and frame 2 treated as the current frame. At 1404, a second filtering step occurs with the result of the first filtering step 1402 treated as the previous frame and frame 3 treated as the current frame. At 1406, a third filtering step occurs with the result of the second filtering step 1404 treated as the previous frame and frame 4 treated as the current frame. At 1460, an L−1 filtering step occurs with the result of the previous filtering step treated as the previous frame and frame L treated as the current frame. It can be noted that employing a number of frames greater than two an output can be produced at different steps. A higher number of steps leads to greater noise reduction. In an embodiment employing TNR, 2·(M×M) pixels are considered (M×M on previous frame and M×M on current frame) to perform noise reduction by means of weighted low pass filtering.

2.2 Weighted Average+Spatial Noise Reduction (WA+SNR).

In an embodiment, after stabilization, the images may be assembled using a weighted average. In this step, weights may be assigned depending on the similarity of the frames with respect to the first frame, which is used as reference. The weights may be given by means of a weighting function g, which will be described in more detail hereinbelow.

Spatial filtering may be done by applying a spatial filter to the output of the blending process. In an embodiment the spatial noise reduction (see A. Bosco, A. Bruna, "Filtering of noisy images", U.S. patent application Ser. No. 11/148,850, may be carried out using the same technique described in Chapter 2.1, but only pixels of the current frame are used; thus the filtering window consists of M×M pixels instead of 2·(M×M).

2.2.1 Weighting Function

Figure 15:
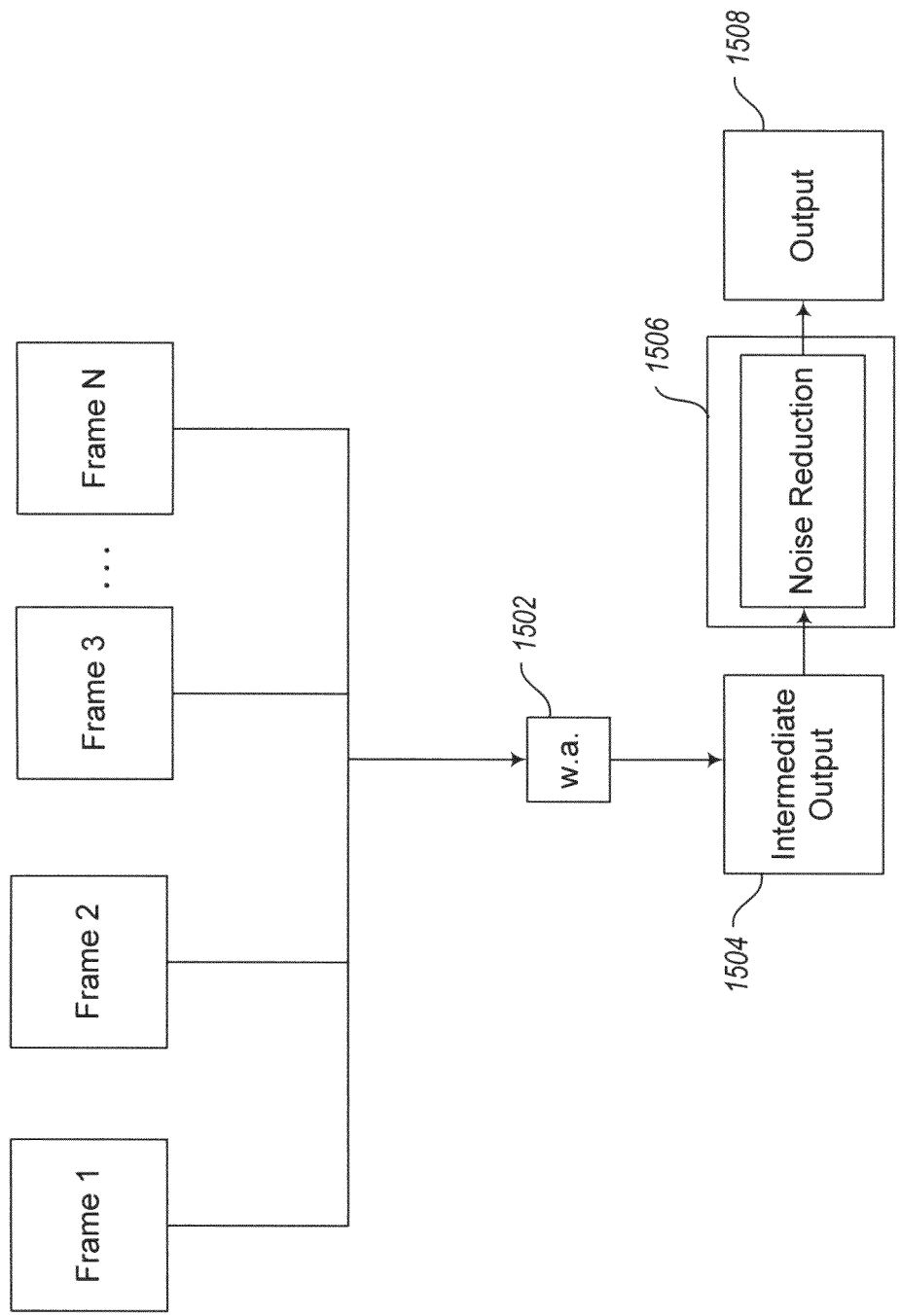
FIG. 15 illustrates an embodiment of a method of noise reduction employing weighted averaging followed by spatial filtering.

The weighting/blending process may be performed on Bayer pattern data. In one embodiment, illustrated in FIG. 15, weights for each frame are computed at 1502 (the weights may be computed simultaneously) and weighting average (W.A.) is obtained as follows:

$$\text{temp\_filtered}(x, y) = \frac{1 \cdot \text{frame}_1(x, y) + \sum_{i=2}^{N} g_i(x, y) \cdot \text{frame}_i(x, y)}{1 + \sum_{i=2}^{N} g_i(x, y)} \quad (9)$$

$$g_i(x, y) = \text{gaussian}(d_i(x, y), \sigma^2)$$

$$d_i(x, y) = |\text{frame}_1(x, y) - \text{frame}_i(x, y)|$$

$$i = 2 \dots N$$

Figure 16:
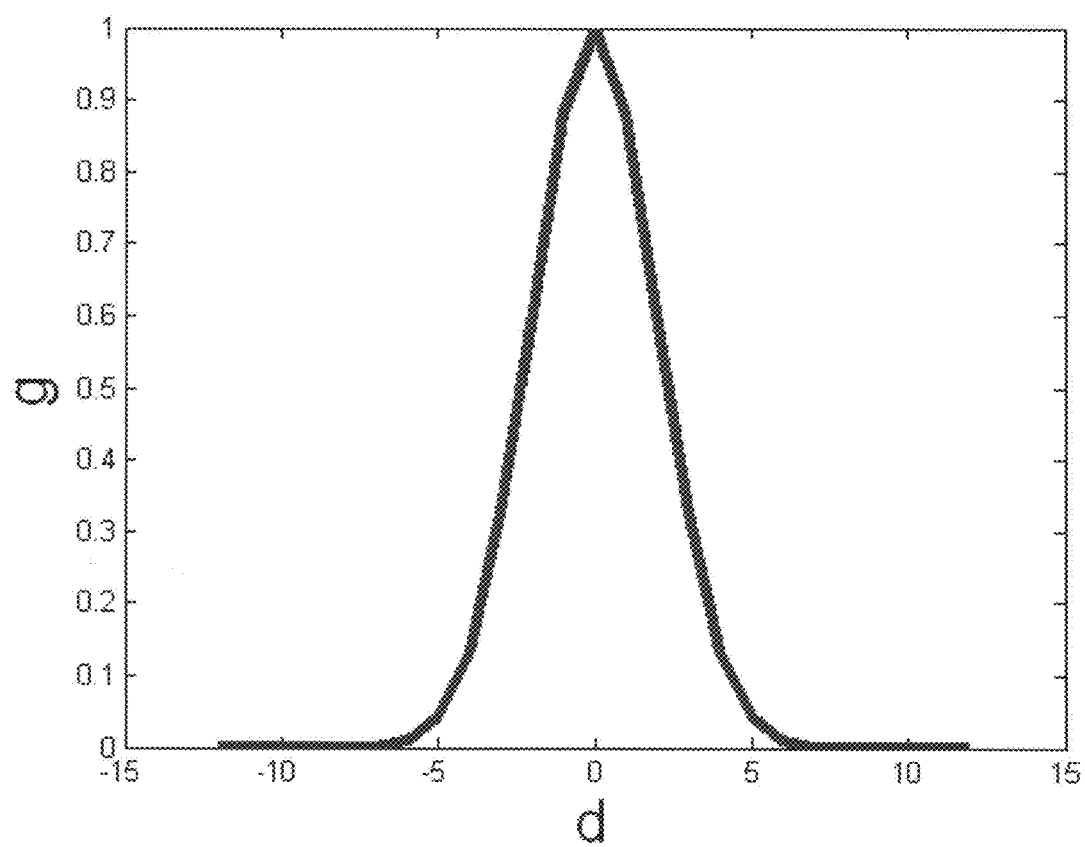
FIG. 16 illustrates a Gaussian function whose values g are computed according to the absolute pixel distances d.

This produces an output 1504, which as illustrated is an intermediate output, which may be a temporal weighted average. Noise reduction 1506 is applied to the intermediate output 1504 to produce a blended weighted output 1508. The noise reduction may be spatial filtering noise reduction. In one embodiment, the blending weights are given by a Gaussian function, fed by the absolute distances between pixels of the reference and current frames, which measures similarity with the reference frame on a per pixel basis, as illustrated in FIG. 16.

Figure 17:
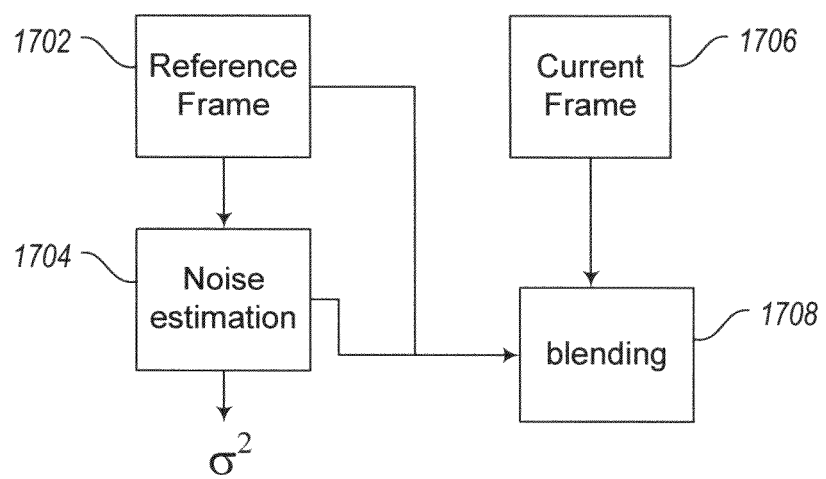
FIG. 17 illustrates an embodiment of a method of noise reduction using Sigma noise estimation on reference frame. The value is used to compute Gaussian blending weights between the reference frame and the frame to be blended.

FIG. 17 illustrates an embodiment of a method of computing the weighting function. The sigma value is used to compute Gaussian blending weights between the reference frame and the frame to be blended. To determine the shape of the Gaussian function, the sigma value (rms value) of noise affecting the reference frame may be estimated 1704 using the same technique described in Ch. 2.1. Once the parameter sigma is known, the Gaussian and thus the weighting function may be computed as illustrated in FIG. 17. A reference frame 1702 is used for noise estimation 1704. The reference frame 1702 is blended 1708 with a current frame 1706 based on the weighting function.

2.2.2 Weighting Variable Function

In an embodiment, instead of using the output of the Gaussian function for the given sigma noise, noise perturbation of the reference pixel may be taken into account as follows:

$$g(x, y) = \max(g(d_1(x, y), \sigma^2), \quad (10)$$
$$g(d_2(x, y), \sigma^2), g(d_3(x, y), \sigma^2), g(d_N(x, y), \sigma^2))$$

$$\begin{cases} d_1(x, y) = |(\text{reference}(x, y)) - \text{frame}(x, y)| \\ d_2(x, y) = |(\text{reference}(x, y) \pm \sigma) - \text{frame}(x, y)| \\ d_3(x, y) = |(\text{reference}(x, y) \pm 2\sigma) - \text{frame}(x, y)| \\ d_N(x, y) = |(\text{reference}(x, y) \pm 3\sigma) - \text{frame}(x, y)| \end{cases}$$

This may provide stronger filtering, as indicated in simulations.

The weighting process addresses cases where the stabilization process could be unreliable, for example, due to:
 1. occasional failure;
 2. unrecoverable motion (rotation, strong panning, and so on).

Figure 18:
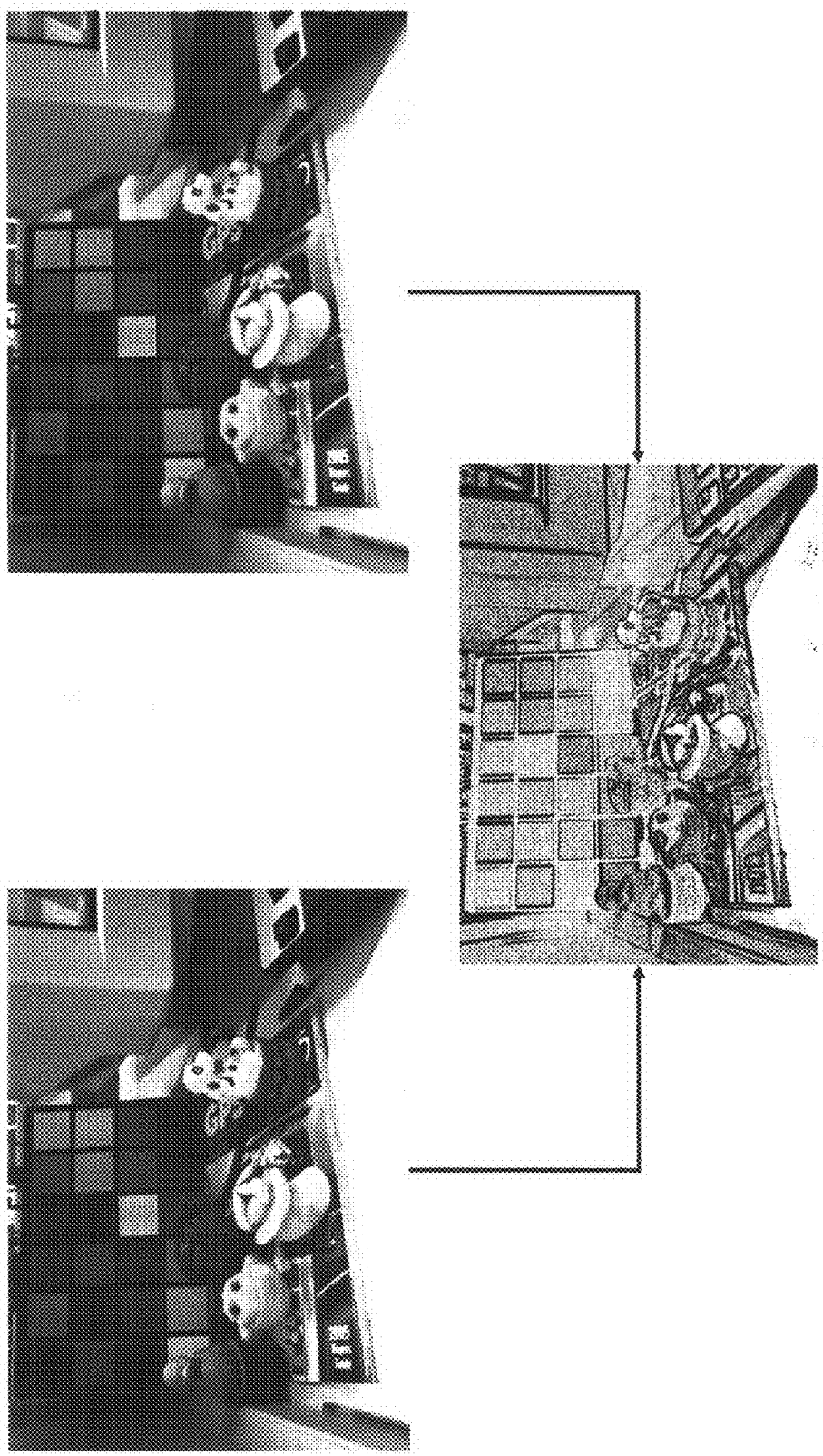
FIG. 18 illustrates two images that are not perfectly aligned due to a small rotation. The bottom image gives a grey-scale representation of blending weights (dark values correspond to low weights and vice versa). The misalignment is evidently due to low weights along image feature borders.

An example of such situation is shown in FIG. 18, where the bottom image gives a grayscale representation of computed weights between the two upper frames. Due to a small amount of rotation, the stabilization algorithm was unable to act correctly (this is made evident by the low weights along feature edges).

2.3 Best Shot Selection+Recursive Spatial Noise Reduction (BS+RSNR).

Figure 19:
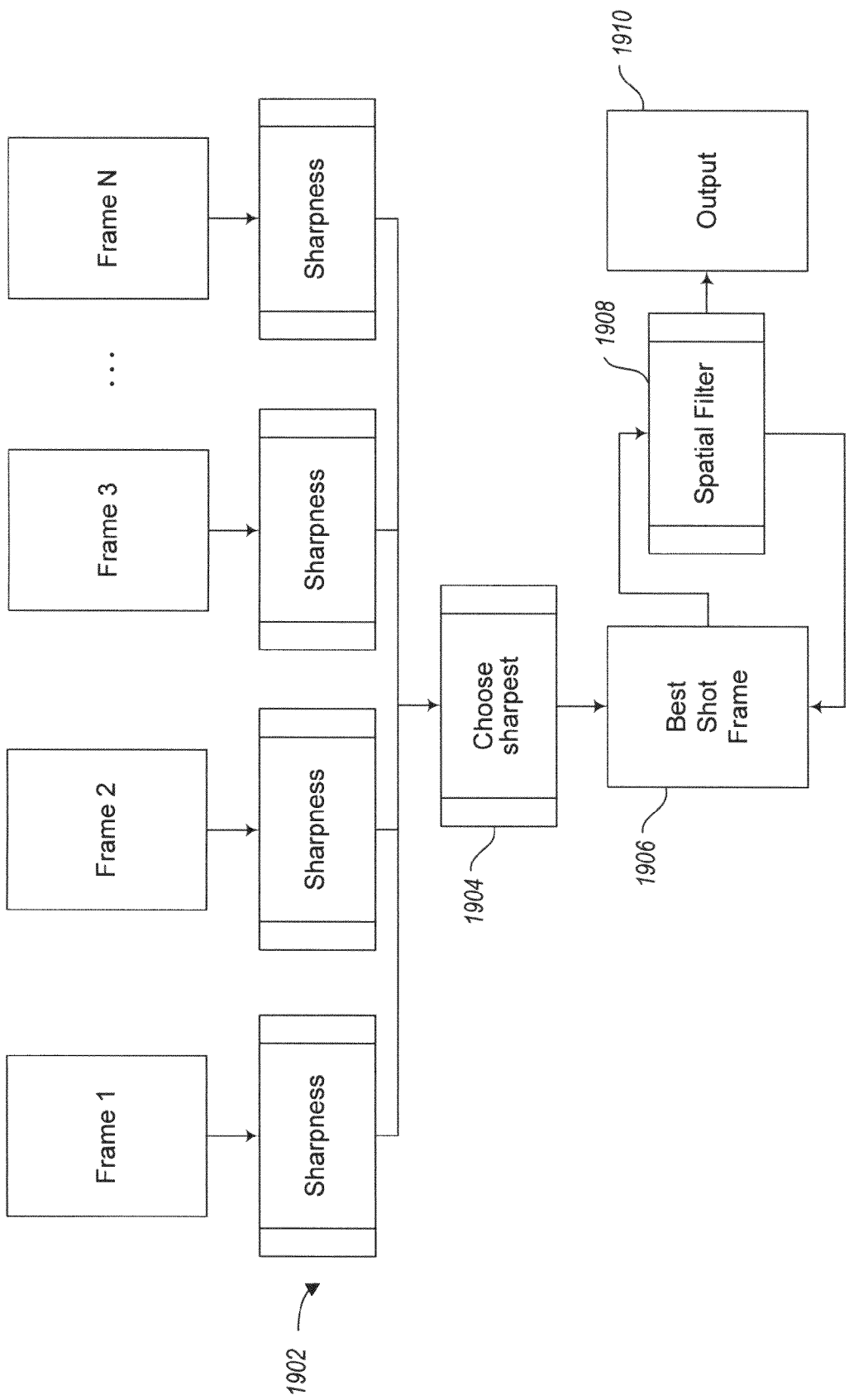
FIG. 19 illustrates an embodiment of a method of noise reduction employing best shot selection+(Recursive) Spatial Noise Reduction. The sharpest image is identified and retained for successive spatial filtering.

This is a generally less computationally expensive embodiment for attenuating defects due to motion blur and noise. In this case, for each incoming frame of N frames, a sharpness measure is computed and the frame achieving the highest value is retained, therefore only one frame buffer is needed. Filtering, such as one of the aforementioned spatial filters, may then be applied on the sharpest frame. The filter can also be applied in a recursive fashion for an enhanced attenuation of the noise level. FIG. 19 illustrates an embodiment of a the best shot selection+(Recursive) Spatial Noise Reduction method. At 1902, the sharpness of each of the N frames is determined. At 1904, the sharpest image is selected and used in a recursive noise reduction scheme employing best shot selection 1906 and spatial filtering 1908 to produce an output image 1910.

3. Experimental Results

Different images have been captured using a 2MP CMOS sensor, an STV0750) 2MP CMOS sensor, in automated fashion (via SoftIP script), and also using a consumer 7MP CCD camera.

Short exposed images have been acquired with integration time reduced by ¼.

To reach the same mean gray level of long exposed image in the short ones, analog and digital gains have been adjusted.

Each image has been processed according to an embodiment.

For comparison purposes each image has been processed with the following methods:

Average of input frames;

Weighted average. Based on estimated noise σ a Gaussian weighted average is performed;

Variable weighted average. Based on estimated noise σ a Gaussian variable weighted average is performed (i.e., weights are computed in a surround of σ and the maximum weight is retained);

Selection of sharpest frame and application of iterative spatial noise reduction (for example, ARCTIC) was employed. See A. Bosco, A. Bruna, "Filtering of noisy images", U.S. patent application Ser. No. 11/148,850.

Evaluation SNR on homogenous patches.

Mean sharpness computation using Sobel filters.

3.1 SNR Computation

Noise is estimated by capturing images containing perfectly flat (uniform) regions. Macbeth patches may be used for this purpose. The mean variance may be computed on three patches, on Gr (Gb) channel, as follows:

$$snr = 10\log_{10}\left(\frac{\sigma^2(\text{signal} + \text{noise})}{\sigma^2(\text{noise})}\right) \quad (11)$$

Figure 20:
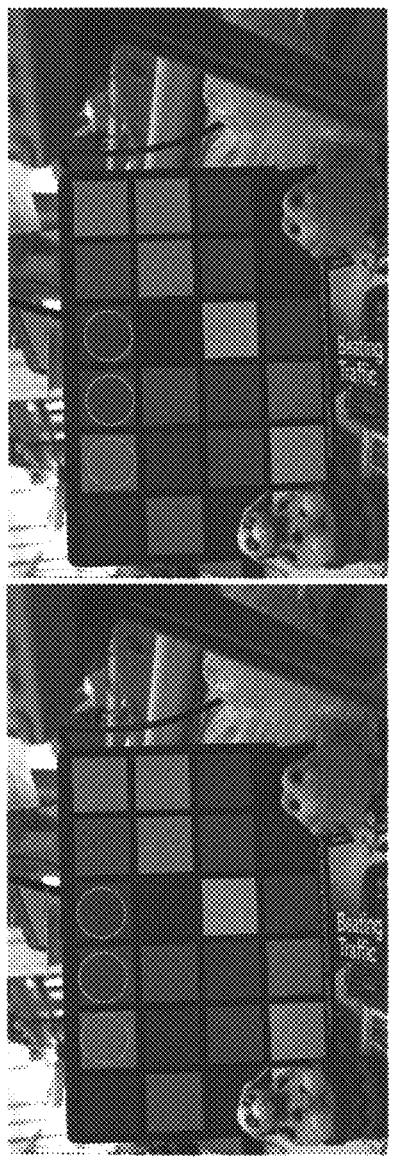
FIG. 20 illustrates Macbeth patches used for SNR computation in short (left) and long (right) exposure images.

FIG. 20, for example, shows two images: short integration time image (1/20 exposure time 800 ISO) and long integration time image (1/5 exposure time 200 ISO), for which SNR values are calculated. The SNR value estimated on the short exposure image (28.02) is lower than the SNR estimated on the long exposed image (32.83), because the short exposed one is noisier.

Figure 21:
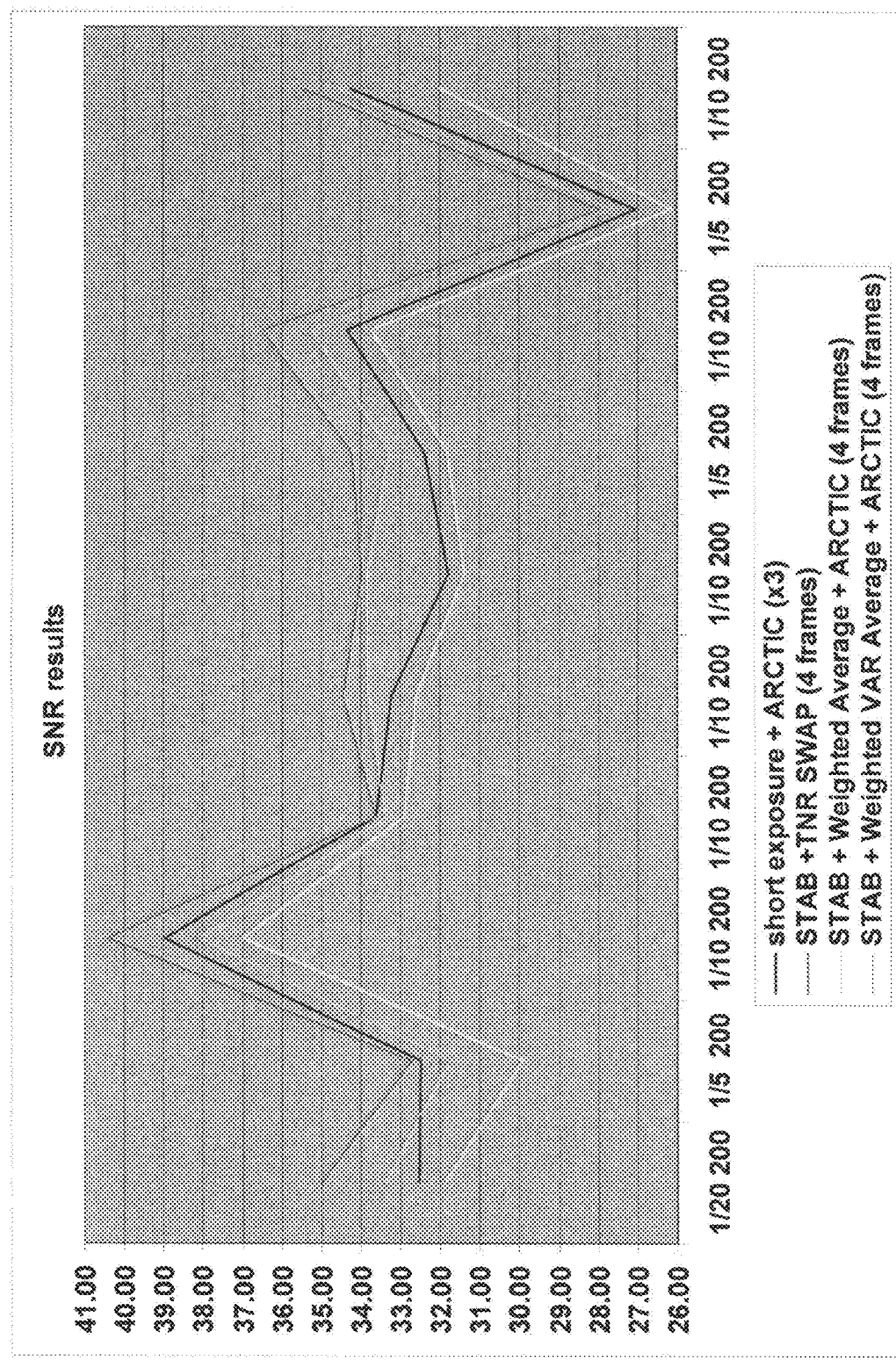
FIG. 21 is a graphic illustration of SNR results using a consumer 7MP CCD camera.

The SNR results, obtained using a consumer 7MP CCD camera, showing that the TNR algorithm achieves better performances, are reported in the following Table 1 and a graphical representation is reproduced in FIG. 21:

TABLE 1

SNR results using a consumer 7MP CCD camera.

| CCD SNR results | 1/20 200 | 1/5 200 | 1/10 200 | 1/10 200 | 1/10 200 | 1/10 200 | 1/5 200 | 1/10 200 | 1/5 200 | 1/10 200 |
|---|---|---|---|---|---|---|---|---|---|---|
| long | 28.67 | 26.13 | 34.29 | 31.47 | 29.98 | 30.20 | 27.44 | 32.68 | 25.42 | 31.23 |
| long + ARCTIC | 36.15 | 32.46 | 40.25 | 33.24 | 33.81 | 33.64 | 33.92 | 36.33 | 32.64 | 34.45 |
| short exposure | 20.94 | 18.71 | 27.10 | 26.08 | 23.52 | 23.28 | 20.74 | 26.62 | 17.37 | 23.60 |
| short + ARCTIC | 29.32 | 27.61 | 35.21 | 32.16 | 30.93 | 30.33 | 29.49 | 32.67 | 24.62 | 31.29 |
| short + ARCTIC (x2) | 32.00 | 30.95 | 37.58 | 33.25 | 32.64 | 31.43 | 31.51 | 33.79 | 26.47 | 33.31 |
| short + ARCTIC (x3) | 32.53 | 32.50 | 38.99 | 33.62 | 33.24 | 31.81 | 32.40 | 34.34 | 27.03 | 34.24 |
| TNR (2) | 28.71 | 25.65 | 34.56 | 31.57 | 29.83 | 29.71 | 28.21 | 32.09 | 23.31 | 30.33 |
| TNR SWAP (4) | 34.94 | 32.72 | 40.40 | 33.60 | 34.43 | 33.96 | 34.22 | 36.47 | 27.94 | 35.40 |
| Weighted Average (2) | 30.65 | 28.80 | 36.12 | 32.41 | 31.58 | 31.06 | 30.35 | 33.33 | 25.24 | 31.42 |
| Weighted Average (4) | 31.87 | 29.95 | 36.99 | 32.94 | 32.62 | 31.42 | 31.82 | 33.73 | 26.17 | 32.01 |
| Weighted VAR Average (2) | 31.75 | 29.80 | 36.51 | 32.83 | 32.40 | 31.84 | 31.61 | 34.83 | 25.83 | 32.96 |
| Weighted VAR Average (4) | 33.40 | 31.79 | 38.15 | 33.38 | 33.81 | 33.86 | 33.30 | 35.25 | 27.72 | 34.60 |

Figure 22:
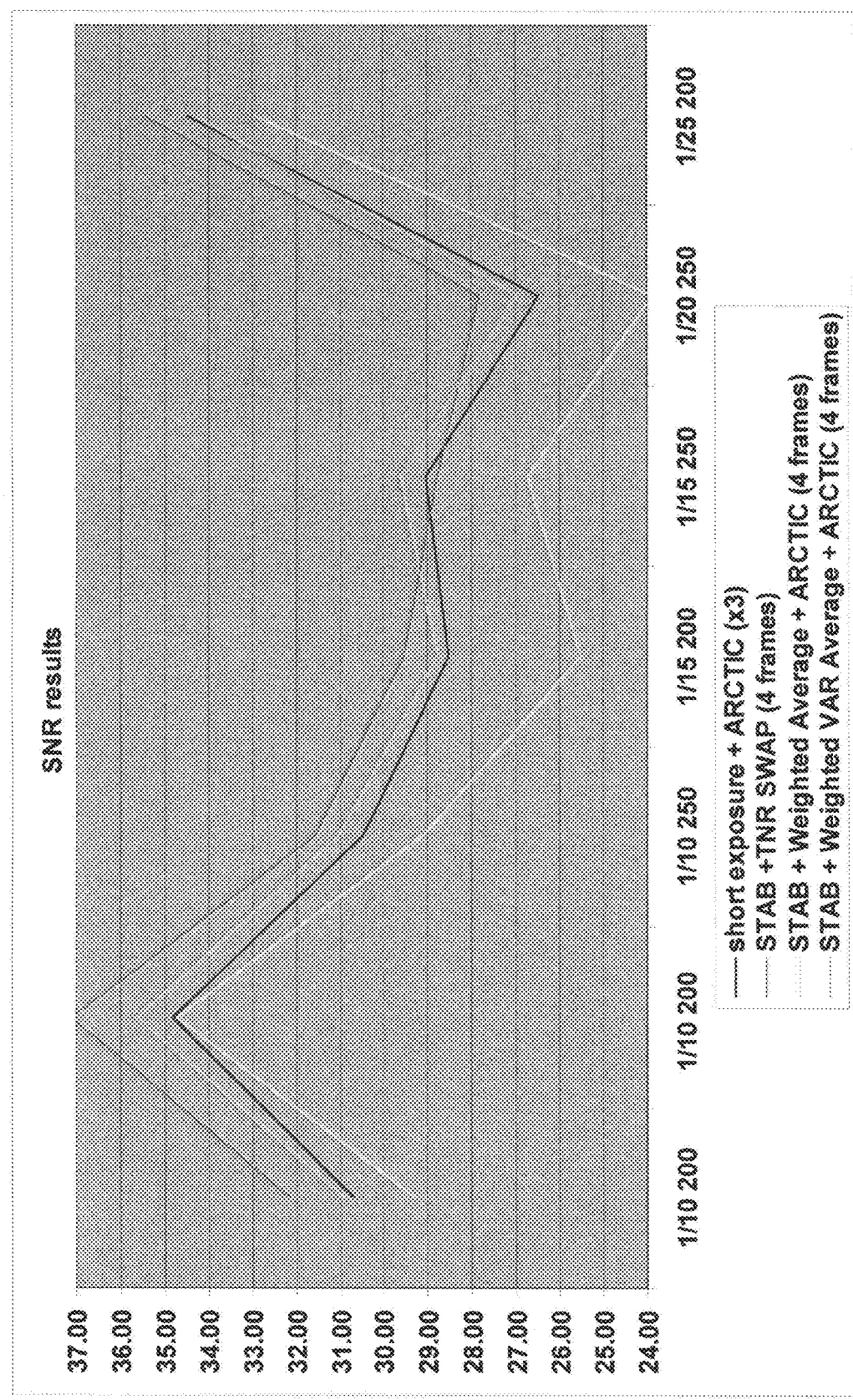
FIG. 22 is a graphic illustration of SNR results using a consumer 7MP CCD camera, in the case of images without any movement.

With the 7MP CCD camera, TNR algorithm achieves better performances also in the case of images without any movement, as reported in the following Table 2 and reproduced in FIG. 22:

TABLE 2

SNR results using a consumer 7MP CCD camera, in the case of images without any movement.

| CCD SNR results | 1/10 200 | 1/10 200 | 1/10 250 | 1/15 200 | 1/15 250 | 1/20 250 | 1/25 200 |
|---|---|---|---|---|---|---|---|
| Long | 25.80 | 33.17 | 25.92 | 23.28 | 24.00 | 22.44 | 30.88 |
| long + ARCTIC | 33.25 | 35.61 | 33.47 | 31.52 | 31.96 | 30.90 | 35.10 |

TABLE 2-continued

SNR results using a consumer 7MP CCD camera, in the case of images without any movement.

| CCD SNR results | 1/10 200 | 1/10 200 | 1/10 250 | 1/15 200 | 1/15 250 | 1/20 250 | 1/25 200 |
|---|---|---|---|---|---|---|---|
| short exposure | 17.64 | 27.70 | 17.73 | 14.20 | 15.21 | 13.29 | 22.96 |
| Short + ARCTIC | 26.60 | 33.15 | 26.51 | 23.10 | 24.45 | 21.80 | 31.12 |
| short + ARCTIC (x2) | 29.90 | 34.91 | 29.46 | 26.76 | 27.93 | 25.23 | 33.61 |
| short + ARCTIC (x3) | 30.70 | 34.80 | 30.48 | 28.53 | 29.05 | 26.48 | 34.48 |
| TNR (2) | 24.87 | 32.75 | 24.64 | 20.62 | 21.18 | 19.40 | 29.92 |
| TNR SWAP (4) | 32.15 | 37.11 | 31.53 | 29.54 | 28.80 | 27.81 | 35.43 |
| Weighted Average (2) | 27.87 | 33.96 | 27.82 | 24.28 | 25.49 | 22.83 | 31.87 |
| Weighted Average (4) | 29.31 | 34.74 | 29.14 | 25.52 | 26.75 | 23.88 | 32.95 |
| Weighted VAR Average (2) | 29.22 | 34.26 | 29.50 | 25.90 | 27.30 | 24.27 | 32.84 |
| Weighted VAR Average (4) | 30.93 | 35.68 | 31.07 | 28.79 | 29.63 | 27.03 | 34.36 |

Figure 23:
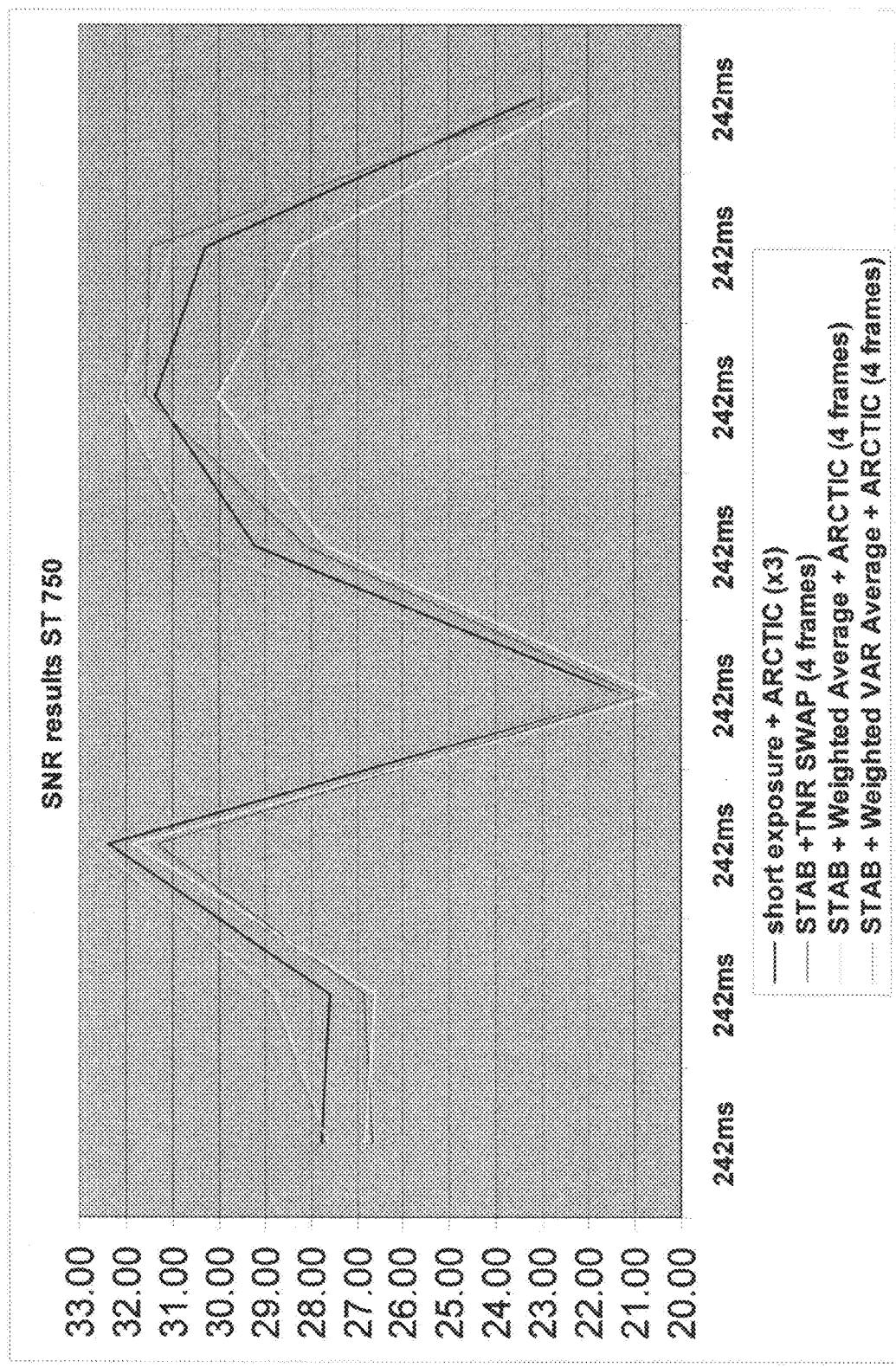
FIG. 23 is a graphic illustration of SNR results using an ST 750 2MP CMOS sensor.

The SNR results, comparing all methods proposed and using a 2MP CMOS sensor, show that the Weighted Variable Average algorithm achieves better performances, as reported in the following Table 3 and reproduced in the graphical representation of FIG. 23.

TABLE 3

SNR results using the ST 750 2MP CMOS sensor.

| SNR results ST 750 | 242 ms | 242 ms | 242 ms | 242 ms | 242 ms | 242 ms | 242 ms | 242 ms |
|---|---|---|---|---|---|---|---|---|
| Long | 25.82 | 26.47 | 30.66 | 19.47 | 26.77 | 29.19 | 25.34 | 22.43 |
| long + ARCTIC | 28.03 | 27.76 | 31.92 | 20.27 | 30.28 | 33.06 | 32.13 | 23.53 |
| short exposure | 22.50 | 22.26 | 27.30 | 17.45 | 22.09 | 24.45 | 17.58 | 18.19 |
| short + ARCTIC | 25.54 | 25.23 | 30.63 | 19.81 | 26.21 | 29.00 | 26.08 | 21.09 |
| short + ARCTIC (x2) | 26.92 | 26.53 | 31.86 | 20.67 | 28.05 | 30.45 | 29.17 | 22.28 |
| short + ARCTIC (x3) | 27.78 | 27.57 | 32.36 | 21.23 | 29.20 | 31.36 | 30.28 | 23.14 |
| TNR (2) | 24.81 | 24.69 | 29.01 | 19.43 | 25.40 | 28.41 | 23.63 | 20.63 |
| TNR SWAP (4) | 26.66 | 26.84 | 31.33 | 20.95 | 28.09 | 31.56 | 31.46 | 22.60 |
| Weighted Average (2) | 26.28 | 26.05 | 31.28 | 20.26 | 27.05 | 30.18 | 26.78 | 21.78 |
| Weighted Average (4) | 26.82 | 26.63 | 31.83 | 20.57 | 27.68 | 30.02 | 28.27 | 22.24 |
| Weighted VAR Average (2) | 27.52 | 27.36 | 32.30 | 21.06 | 28.81 | 30.56 | 28.76 | 23.20 |
| Weighted VAR Average (4) | 27.65 | 28.80 | 32.70 | 21.23 | 30.61 | 32.15 | 31.05 | 23.53 |

Figure 24:
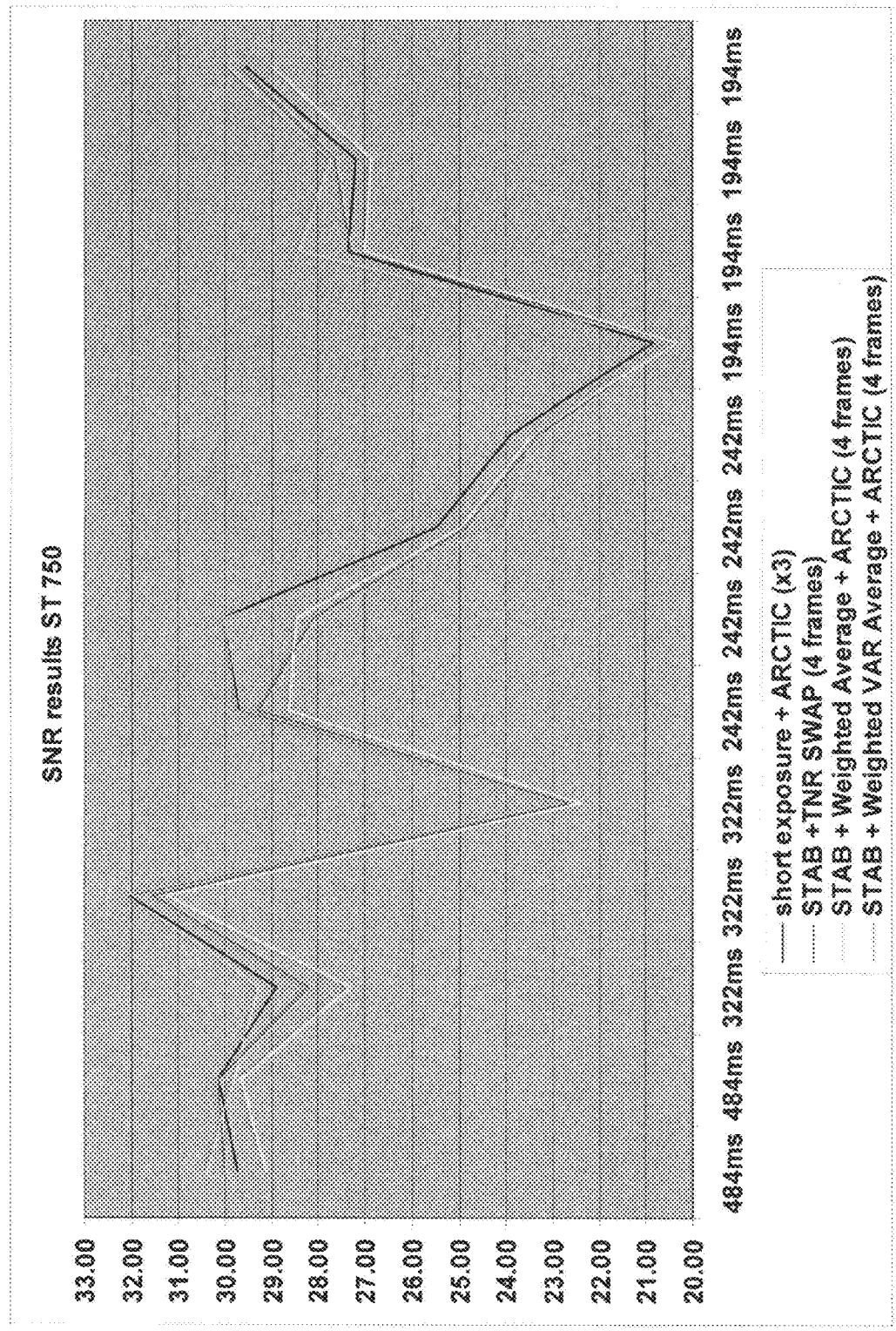
FIG. 24 is a graphic illustration of SNR results using an ST 750 2MP CMOS sensor, in the case of gain application.

In the case of ST 750 2MP CMOS sensor, Weighted Variable Average achieves better performances also when gains are applied, as reported in the following Table 4 and reproduced in FIG. 24:

TABLE 4

SNR results using the ST 750 2MP CMOS sensor, in the case of gains application.

| SNR results ST 750 | 484 ms | 484 ms | 322 ms | 322 ms | 322 ms | 2242 ms | 2242 ms |
|---|---|---|---|---|---|---|---|
| Long | 28.06 | 27.69 | 26.45 | 28.06 | 21.08 | 26.92 | 26.36 |
| long + ARCTIC | 30.57 | 30.11 | 29.11 | 30.09 | 21.57 | 29.08 | 28.70 |
| short exposure | 24.37 | 24.58 | 23.02 | 24.58 | 20.82 | 23.14 | 22.37 |
| short + ARCTIC | 28.39 | 28.78 | 27.35 | 30.21 | 22.32 | 28.07 | 27.36 |
| short + ARCTIC (x2) | 29.46 | 29.75 | 28.38 | 31.33 | 22.65 | 29.20 | 29.29 |
| short + ARCTIC (x3) | 29.73 | 30.15 | 28.89 | 32.07 | 22.84 | 29.68 | 30.03 |
| TNR (2) | 27.70 | 28.06 | 25.75 | 28.76 | 22.02 | 26.51 | 25.30 |
| TNR SWAP (4) | 30.00 | 30.14 | 28.18 | 31.53 | 22.66 | 29.28 | 28.10 |
| Weighted Average (2) | 28.98 | 29.50 | 27.32 | 30.31 | 22.30 | 28.05 | 28.15 |
| Weighted Average (4) | 29.13 | 29.64 | 27.32 | 31.26 | 22.40 | 28.65 | 28.46 |
| Weighted VAR Average (2) | 29.36 | 29.83 | 28.62 | 31.23 | 22.83 | 29.13 | 28.65 |
| Weighted VAR Average (4) | 30.41 | 29.83 | 29.30 | 32.08 | 22.84 | 29.71 | 30.03 |

Reducing the number of buffers to be used (from 4 to 2), the loss of performances are reported, for each algorithm proposed, in the following Table 5, for a 7MP CCD camera, and Table 6, for a STV0750 2MP CMOS sensor:

TABLE 5

Loss of performance, reducing algorithm complexity, for a 7MP CCD camera.

| CCD SNR (media) | 1 step | 3 steps | Improving | Loss of performance |
|---|---|---|---|---|
| Recursive Arctic | 28.84 | 32.07 | 3.23 | High |
| Weighted Average | 29.71 | 30.69 | 0.98 | Medium |
| Weighted VAR Average | 30.80 | 32.51 | 1.71 | High |
| TNR | 27.49 | 33.32 | 5.83 | High |

TABLE 6

Loss of performance, reducing algorithm complexity, for the ST 750 2MP CMOS sensor.

| ST750 SNR (media) | 1 step | 3 steps | Improving | Loss of performance |
|---|---|---|---|---|
| Recursive Arctic | 25.92 | 27.65 | 1.73 | High |
| Weighted Average | 26.38 | 26.79 | 0.40 | Low |
| Weighted VAR Average | 27.25 | 27.95 | 0.70 | Medium |
| TNR | 24.98 | 27.26 | 2.28 | High |

Looking at this SNR results, for the tested CCD camera, the TNR method achieves best results, with a good improvement comparing to the other methods, averaged on 0.81 dB better than Weighted Variable Average method and 1.25 dB better than Recursive Arctic method. For the ST750 sensor, the Weighted Variable Average method achieves best results, with less improvement, but still appreciable, comparing to the other methods, in media 0.30 dB better than Recursive Arctic method and 0.69 dB better than TNR method.

Moreover, in general, if a reduced number of frame buffers is used, for the TNR method there is a high loss of performance, for the Weighted Variable Average method there is a high/medium loss of performance, for the Recursive Arctic method there is a medium/low loss of performance.

3.2 Sharpness Measure

Figure 25:
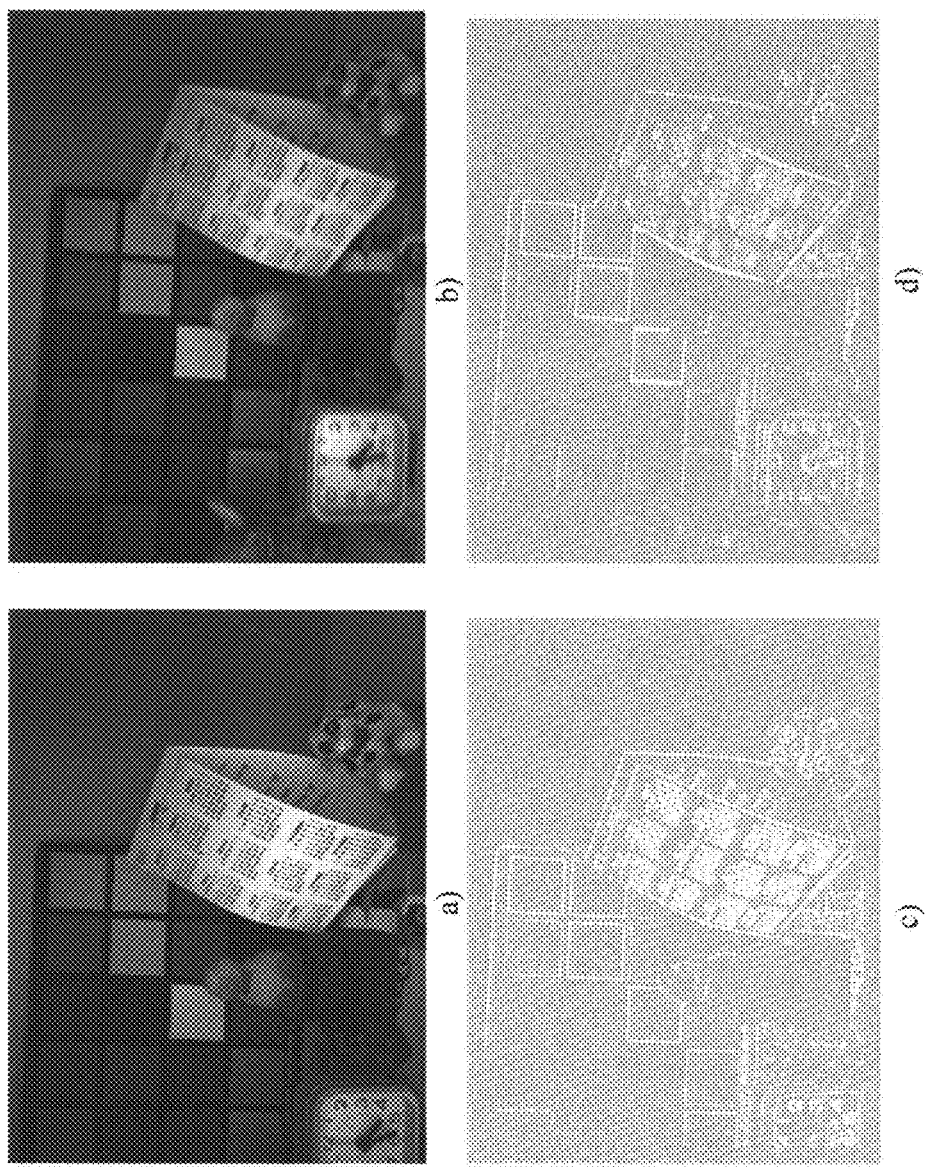
FIG. 25 illustrates: a) a short exposure image; b) a long exposure image; c) a mask containing the edges of the short exposure image, obtained with Sobel filter; d) a mask containing the edges of the long exposure image, obtained with Sobel filter.

The same measures described in the frames ordering step (see Chapter 1.1) are used to measure the sharpness of output images. According to an embodiment, Sobel filters are used to estimate sharpness. FIG. 25 shows an example of sharpness evaluation using Sobel filter, in which the masks containing the edges are shown. Both the sharpness values estimated using Sobel filters (33856) and FSWM (3239) on the image taken with a short exposure, are bigger than the sharpness values estimated using Sobel filters (21056) and FSWM (1904) on the image taken with a long exposure time. The image taken with a short exposure time is sharper.

Figure 26:
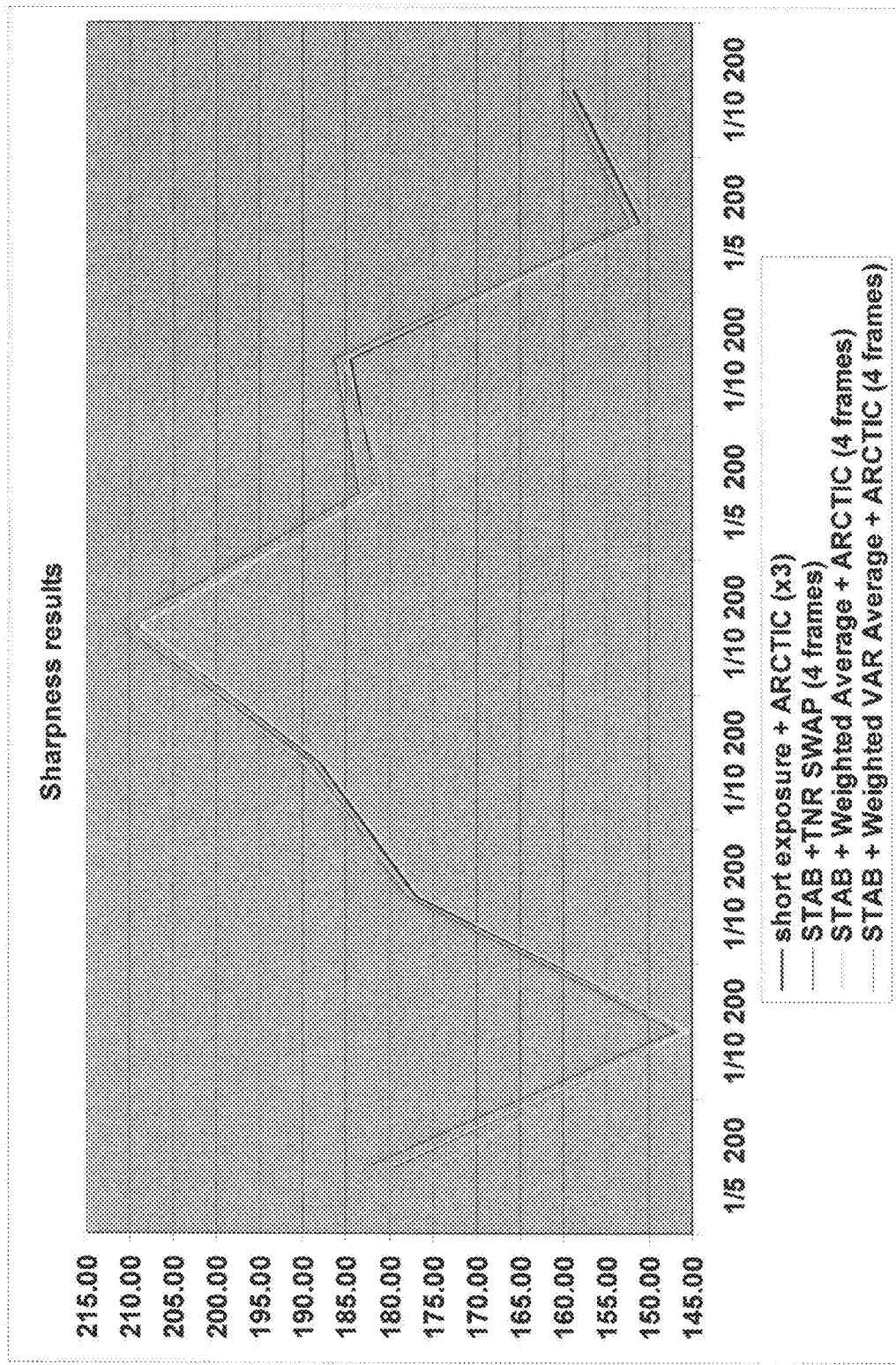
FIG. 26 is a graphic illustration of sharpness results using a consumer 7MP CCD camera.

The sharpness results, obtained with the methods proposed, using a consumer 7MP CCD camera, show that the TNR algorithm achieves slightly better performances, as reported in the following Table 7 and reproduced in the graphical representation of FIG. 26:

TABLE 7

Sharpness results using a consumer 7MP CCD camera.

| CCD Sharpness results | 1/5 200 | 1/10 200 | 1/10 200 | 1/10 200 | 1/10 200 | 1/5 200 | 1/10 200 | 1/5 200 | 1/10 200 |
|---|---|---|---|---|---|---|---|---|---|
| long | 141.98 | 137.54 | 156.78 | 173.33 | 165.78 | 155.30 | 155.87 | 129.14 | 154.96 |
| long + ARCTIC | 142.39 | 137.83 | 157.20 | 173.78 | 165.76 | 155.39 | 156.02 | 129.23 | 154.78 |
| short exposure | 175.70 | 144.64 | 175.88 | 186.58 | 207.26 | 178.33 | 184.87 | 147.73 | 157.69 |
| short + ARCTIC | 179.18 | 145.43 | 176.72 | 187.67 | 208.59 | 180.86 | 184.87 | 150.67 | 158.67 |
| short + ARCTIC (x2) | 179.44 | 145.44 | 176.76 | 187.98 | 208.71 | 181.25 | 184.63 | 150.96 | 158.88 |
| short + ARCTIC (x3) | 179.38 | 145.45 | 176.88 | 188.01 | 208.84 | 181.42 | 184.43 | 151.05 | 158.78 |
| TNR (2) | 178.64 | 145.80 | 177.18 | 187.71 | 209.19 | 180.55 | 185.60 | 149.93 | 158.63 |
| TNR SWAP (4) | 182.39 | 146.88 | 178.10 | 188.93 | 211.11 | 183.41 | 186.26 | 152.23 | 159.53 |
| Weighted Average (2) | 179.15 | 145.64 | 176.91 | 187.73 | 208.76 | 180.49 | 185.00 | 150.41 | 158.37 |
| Weighted Average (4) | 179.45 | 145.45 | 176.59 | 187.88 | 208.86 | 181.50 | 184.93 | 150.76 | 158.14 |
| Weighted VAR Average (2) | 176.92 | 145.95 | 178.40 | 188.63 | 210.31 | 177.87 | 185.34 | 149.25 | 156.84 |
| Weighted VAR Average (4) | 175.37 | 146.14 | 177.45 | 190.15 | 211.22 | 180.31 | 185.47 | 149.29 | 158.10 |

Figure 27:
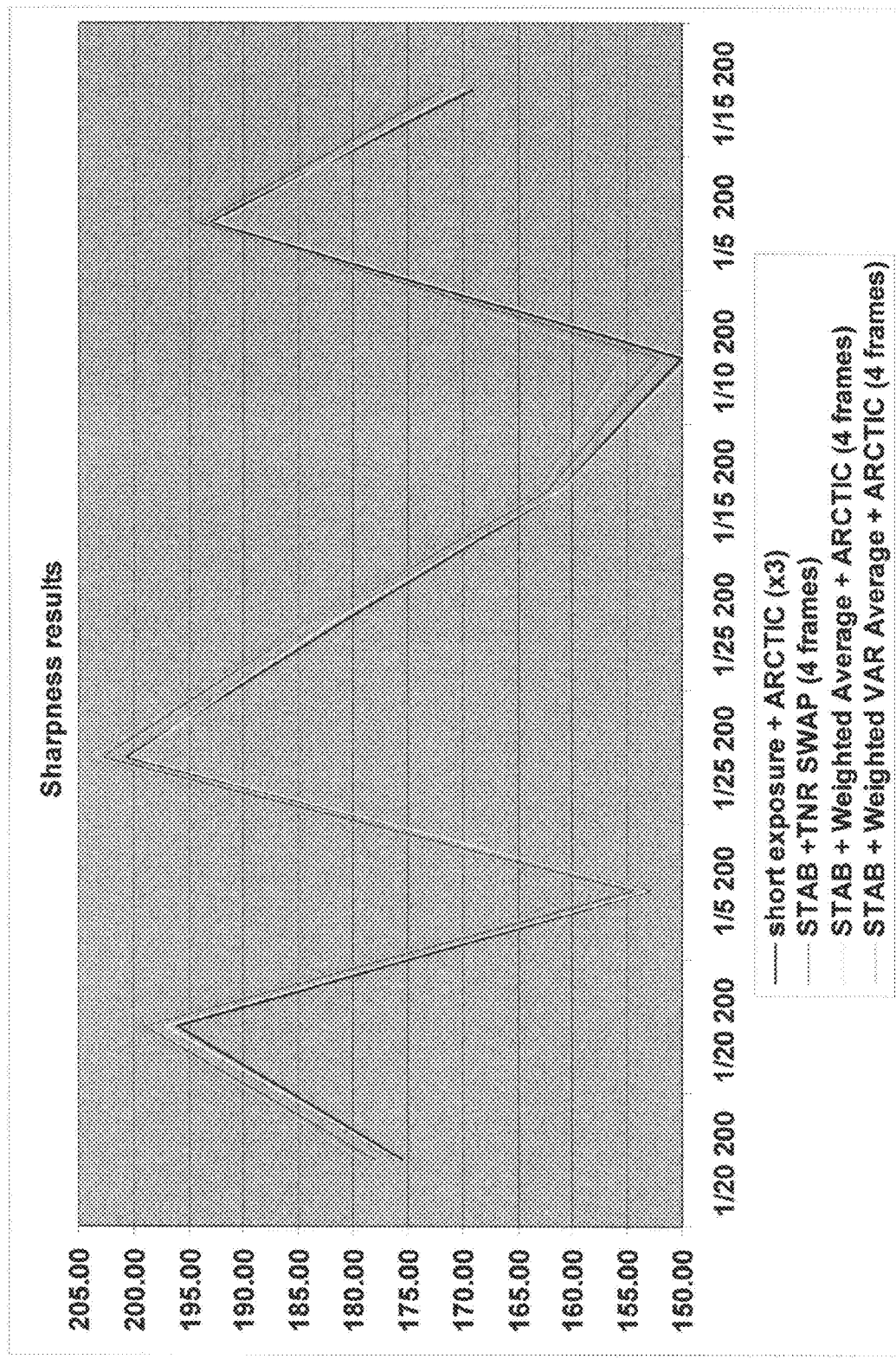
FIG. 27 is a graphic illustration of sharpness results using a consumer 7MP CCD camera, in the case of still images.

Instead, in the case of images without any movement and a 7MP CCD camera, Weighted Variable Average achieves slightly better performances, as reported in the following Table 8 and reproduced in FIG. 27:

TABLE 8

Sharpness results using a consumer 7MP CCD camera, in the case of still images.

| CCD Sharpness results | 1/20 200 | 1/20 200 | 1/5 200 | 1/25 200 | 1/25 200 | 1/15 200 | 1/10 200 | 1/5 200 | 1/15 200 |
|---|---|---|---|---|---|---|---|---|---|
| long | 148.34 | 163.44 | 129.33 | 155.48 | 157.62 | 131.64 | 130.70 | 158.85 | 131.41 |
| long + ARCTIC | 148.84 | 164.18 | 129.62 | 155.37 | 157.95 | 131.71 | 130.83 | 159.33 | 131.56 |
| short exposure | 174.22 | 195.13 | 151.15 | 195.57 | 180.52 | 159.61 | 144.29 | 195.49 | 171.19 |
| short + ARCTIC | 175.13 | 196.05 | 152.65 | 200.07 | 181.12 | 160.96 | 149.20 | 193.61 | 169.45 |
| short + ARCTIC (x2) | 175.27 | 196.00 | 152.94 | 200.49 | 181.20 | 161.14 | 149.95 | 193.33 | 169.16 |
| short + ARCTIC (x3) | 175.45 | 196.07 | 152.96 | 200.57 | 181.21 | 161.22 | 149.99 | 193.28 | 169.03 |
| TNR (2) | 176.01 | 196.97 | 153.02 | 199.98 | 182.85 | 160.95 | 149.25 | 193.27 | 171.58 |
| TNR SWAP (4) | 177.93 | 199.04 | 154.38 | 202.84 | 183.93 | 162.24 | 152.10 | 194.04 | 171.76 |
| Weighted Average (2) | 175.59 | 196.38 | 153.23 | 200.15 | 181.94 | 161.27 | 149.24 | 192.47 | 169.72 |
| Weighted Average (4) | 175.79 | 197.20 | 153.12 | 200.32 | 182.20 | 161.15 | 149.42 | 192.60 | 169.98 |
| Weighted VAR Average (2) | 177.58 | 197.40 | 154.52 | 202.04 | 183.12 | 161.39 | 151.83 | 193.05 | 170.46 |
| Weighted VAR Average (4) | 179.29 | 199.33 | 155.92 | 203.91 | 184.00 | 162.92 | 155.50 | 193.36 | 171.11 |

Figure 28:
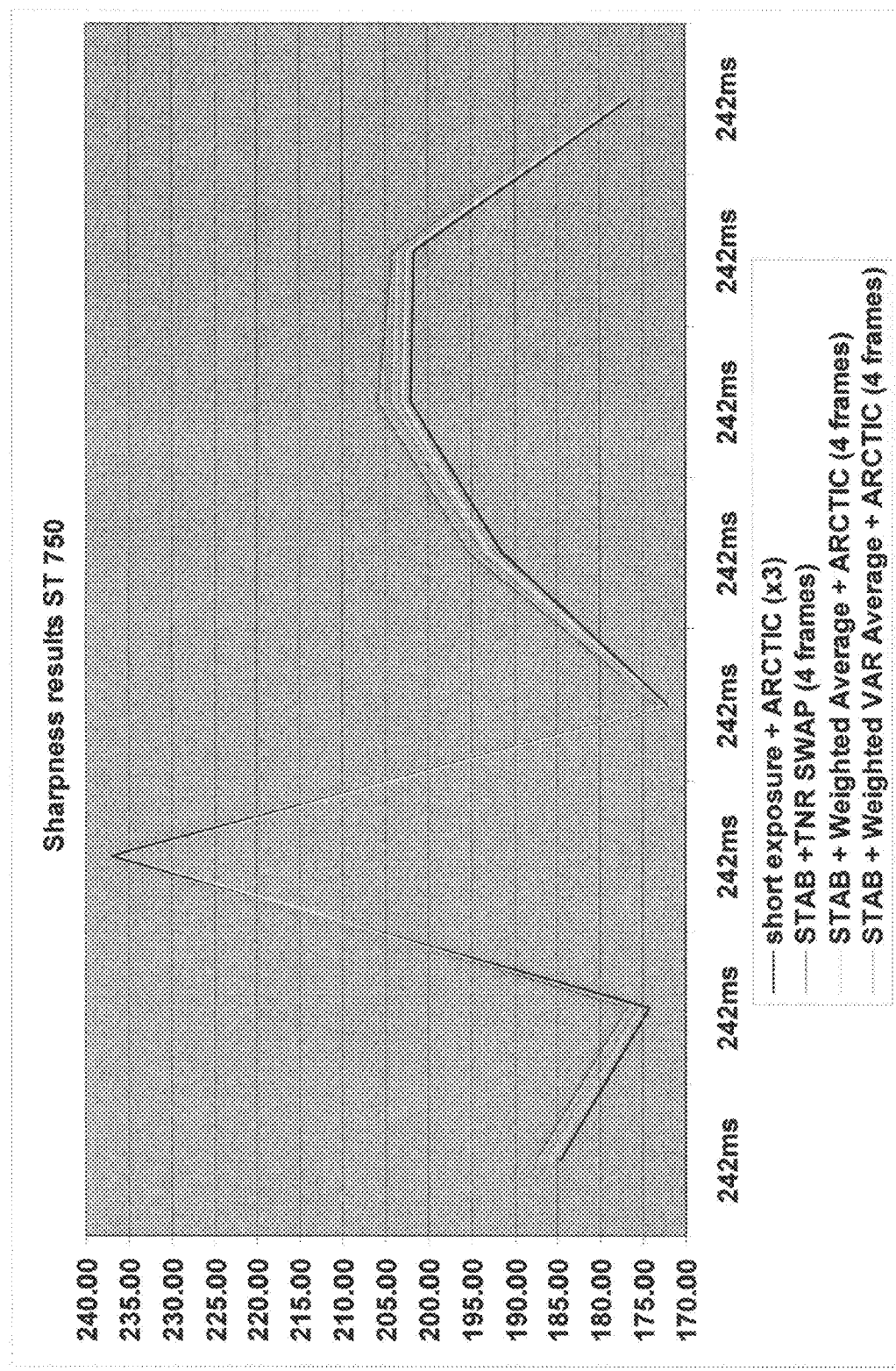
FIG. 28 is a graphic illustration of sharpness results using an ST 750 2MP CMOS sensor.

The sharpness results, obtained with the methods proposed, using a STV0750 2MP CMOS sensor, show that the TNR algorithm achieves slightly better performances, as reported in the following Table 9 and reproduced in the graphical representation of FIG. 28:

TABLE 9

Sharpness results using the ST 750 2MP CMOS sensor.

| Sharpness results ST 750 | 242 ms | 242 ms | 242 ms | 242 ms | 242 ms | 242 ms | 242 ms | 242 ms |
|---|---|---|---|---|---|---|---|---|
| long | 169.20 | 160.00 | 210.90 | 164.71 | 176.21 | 193.17 | 181.45 | 168.55 |
| long + ARCTIC | 168.63 | 159.52 | 211.32 | 165.00 | 175.99 | 192.48 | 181.53 | 168.51 |
| short exposure | 186.86 | 176.13 | 232.77 | 171.21 | 193.75 | 203.23 | 202.47 | 176.30 |
| short + ARCTIC | 186.11 | 175.51 | 235.08 | 171.76 | 192.63 | 203.18 | 202.51 | 176.43 |
| short + ARCTIC (x2) | 185.42 | 174.69 | 236.13 | 171.84 | 191.71 | 202.26 | 201.87 | 176.30 |
| short + ARCTIC (x3) | 184.77 | 174.26 | 236.90 | 171.92 | 191.31 | 201.99 | 201.61 | 176.42 |
| TNR (2) | 187.22 | 176.61 | 233.80 | 172.31 | 194.60 | 204.66 | 203.44 | 177.08 |
| TNR SWAP (4) | 187.41 | 176.91 | 236.01 | 173.23 | 195.05 | 205.76 | 204.07 | 177.91 |
| Weighted Average (2) | 186.14 | 175.58 | 235.83 | 171.71 | 192.76 | 203.18 | 202.57 | 176.72 |
| Weighted Average (4) | 186.11 | 175.47 | 236.28 | 172.16 | 192.85 | 203.01 | 202.48 | 176.84 |
| Weighted VAR Average (2) | 186.13 | 175.91 | 236.94 | 171.90 | 193.53 | 203.17 | 203.09 | 177.61 |
| Weighted VAR Average (4) | 185.92 | 175.52 | 237.83 | 173.39 | 193.34 | 204.10 | 203.68 | 177.88 |

Figure 29:
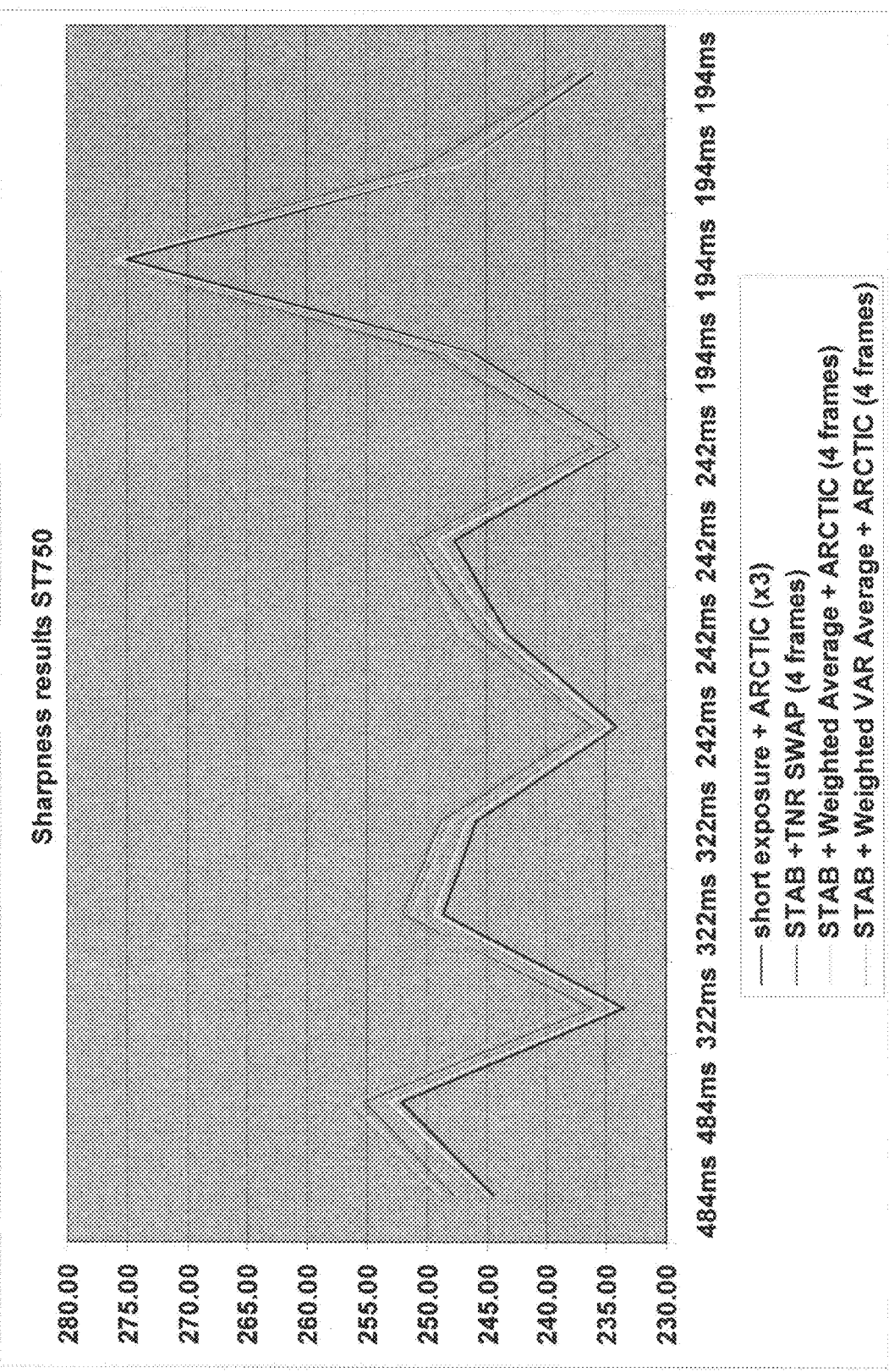
FIG. 29 is a graphic illustration of sharpness results using an ST 750 2MP CMOS sensor, in the case of gain application.

Instead, when gains are applied, for STV0750 2MP CMOS sensor, Weighted Variable Average achieves slightly better performances, as reported in the following Table 10 and reproduced in FIG. 29:

TABLE 10

Sharpness results using the ST 750 2MP CMOS sensor, in the case of gains application.

| Sharpness results ST 750 | 484 ms | 484 ms | 322 ms | 322 ms | 322 ms | 242 ms |
|---|---|---|---|---|---|---|
| long | 233.54 | 195.06 | 216.80 | 232.26 | 227.32 | 225.27 |
| long + ARCTIC | 233.72 | 195.18 | 217.24 | 232.44 | 227.28 | 225.36 |
| short exposure | 242.69 | 251.54 | 231.61 | 247.73 | 245.36 | 232.21 |
| short + ARCTIC | 244.17 | 252.49 | 233.70 | 249.04 | 246.58 | 234.36 |
| short + ARCTIC (x2) | 244.25 | 252.25 | 233.54 | 248.70 | 246.01 | 234.15 |
| short + ARCTIC (x3) | 244.38 | 252.09 | 233.46 | 248.51 | 245.83 | 233.99 |
| TNR (2) | 245.01 | 253.44 | 234.05 | 250.03 | 247.42 | 234.47 |
| TNR SWAP (4) | 247.59 | 255.16 | 236.20 | 251.86 | 248.76 | 236.15 |
| Weighted Average (2) | 244.65 | 253.18 | 233.82 | 249.31 | 246.20 | 234.25 |
| Weighted Average (4) | 244.92 | 253.24 | 234.22 | 249.42 | 246.59 | 234.74 |
| Weighted VAR Average (2) | 245.88 | 253.82 | 235.41 | 250.28 | 247.08 | 234.08 |
| Weighted VAR Average (4) | 249.06 | 256.21 | 237.55 | 251.31 | 248.07 | 235.68 |

Looking at this sharpness results, in general, the three methods achieve similar results, the TNR and Weighted Variable Average methods performing slightly better.

3.3 Visual Results

Various images are shown, in different conditions, to underline pro and cons of each of the three proposed methods. The test conditions are:

1. Low noise: In this case, the results of the three methods are similar, thus the recursive ARCTIC method may be preferred, because it is the simplest method. FIG. 30 shows that TNR output image has sharpness similar to the short image and SNR similar to the long one. FIG. 31 shows the similarity in the results of the three methods.
2. High noise: When noise increases, the recursive ARCTIC method does not perform well, in particular in homogeneous zones, where there is the presence of "blob effects". In this case, the best solutions may be the Weighted VAR Average and TNR methods. FIG. 32 shows that Weighted VAR Average output image has a good sharpness and SNR similar to the long one. FIG. 33 shows the different results of the three methods for this case.
3. Gains application: Also in this case, applying analog and/or digital gains, the best solution may be the Weighted VAR Average method. FIG. 34 shows that Weighted VAR Average output image has good sharpness and good SNR. FIG. 35 shows the different results of the three methods for this case.
4. Not alignment: In the case of failed match in stabilization, due to small rotation and perspective transform, halo effects are visible in Weighted VAR Average method. In this case, the best solution may be the TNR method. FIG. 36 shows that TNR output image has good sharpness and good SNR. FIG. 37 shows the different results of the three methods for this case.

The above tests showed that the TNR method is the most robust algorithm, that effectively reduces halo effects.

4. Operations Count

In this Chapter, the steps of the Weighted Variable Average method are considered, which is the heaviest algorithm in term of operation counts (considering more than one step in Recursive Arctic method), not including sigma estimation and Arctic steps. Table 11 summarizes the operation counts for these steps, considering an input Bayer Pattern image of dimensions (W×H) and a search window for the stabilization of 2*(SW×SW) pixels.

TABLE 11

Operation count for Weighted Variable Average steps (sigma estimation and Arctic are not included, bolded terms are negligible).

| op. per pixel | Add | Diff | mul | div | comp | lut |
|---|---|---|---|---|---|---|
| Sorting | 0.5 | 1 | 1 | 0 | 6 | 0 |
| Stabilization | 1 + (SW · (W + H))/(W · H) | (SW · (W + H))/(W · H) | 0 | 0 | (2 · SW)/(W · H) | 0 |
| Average | 9 | 10 | 3 | 1 | 7 | 7 |
| Total | 10.5 + (SW · (W + H))/(W · H) | 11 + (SW · (W + H))/(W · H) | 4 | 1 | 13 + (2 · SW)/(W · H) | 7 |

5. Stabilization 5.1. Introduction

Different image Motion estimation techniques (feature based, block matching based, optical flow based etc.) are known. See, for example: G. Bella, "Tecniche di stabilizzazione attraverso analisi di similarità tra time series", *Tesi Corso di Laurea in Informatica*, Università degli studi di Catania, 2005; F. Vella, A. Castorina, M. Mancuso, G. Messina, "Digital Image Stabilization By Adaptive Block Motion Vectors Filtering", *IEEE Transactions On Consumer Electronics*, vol. 48, no. 3, August 2002; A. Engelsberg, G. Schmidt, "A comparative review of digital image stabilising algorithms for mobile video communications", *IEEE Transactions on Consumer Electronics*, Vol. 45, No. 3, August 1999.

Most of these techniques are computationally expensive and thus not suited for real time applications. Assuming that eventual misalignments between two successive images are of limited severity and are mostly due to vertical and horizontal shifts (rotational affects are not so perceived for optical models with a wide Field of View), it is possible to obtain a good stabilization through the embodiments of the methods illustrated hereinafter.

5.2. Motion Estimation Through Horizontal and Vertical Characteristic Curves A technique based on motion estimation through horizontal and vertical characteristics curve (See Y. Koo and W. Kim, "An Image Resolution Enhancing Technique Using Adaptive Sub-Pixel Interpolation For Digital Still Camera System", *IEEE Transactions On Consumer Electronics*, Vol. 45, No. 1., February 1999) may be employed for devising a light (from a computational point of view) and fast method.

For simplicity, let's assume that we have two gray-scale frames, captured with two successive captures, where M and N are the horizontal and vertical dimensions and $p_{ij}$ is the pixel value in position (i,j). The characteristics curves along the horizontal and vertical dimensions may be respectively defined as:

$$C_h(j) = \frac{1}{N} \sum_i^N p_{ij} \qquad (12)$$

$$C_v(i) = \frac{1}{M} \sum_j^M p_{ij}$$

Figure 9:
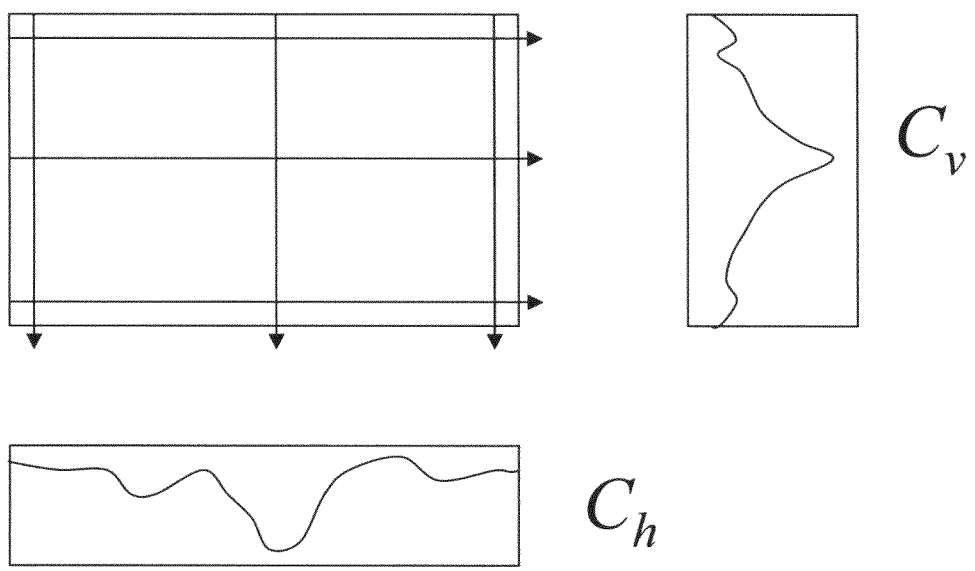
FIG. 9 is a schematic depiction of how characteristic curves are computed.
Figure 10:
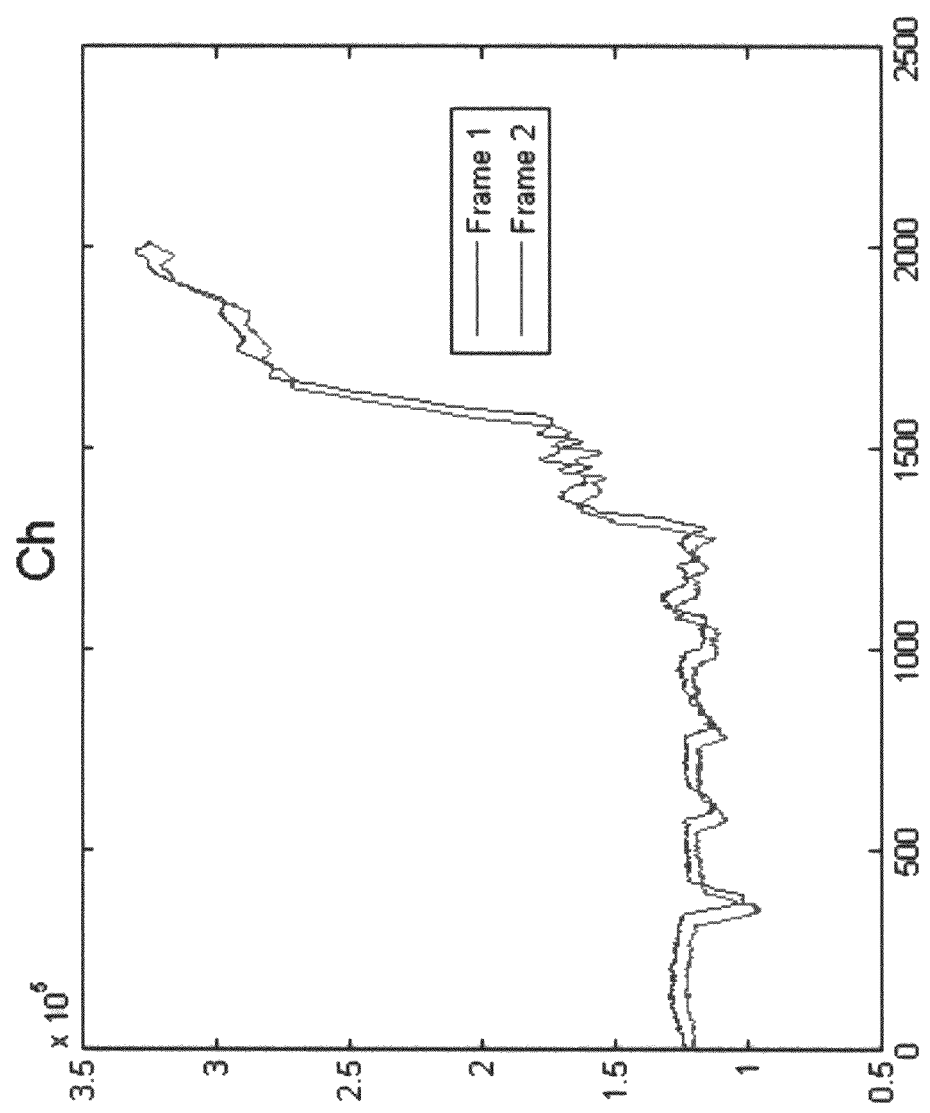
FIG. 10 illustrates two horizontal characteristic curves, with an offset along the x-axis corresponding to horizontal shift between frames.
Figure 11:
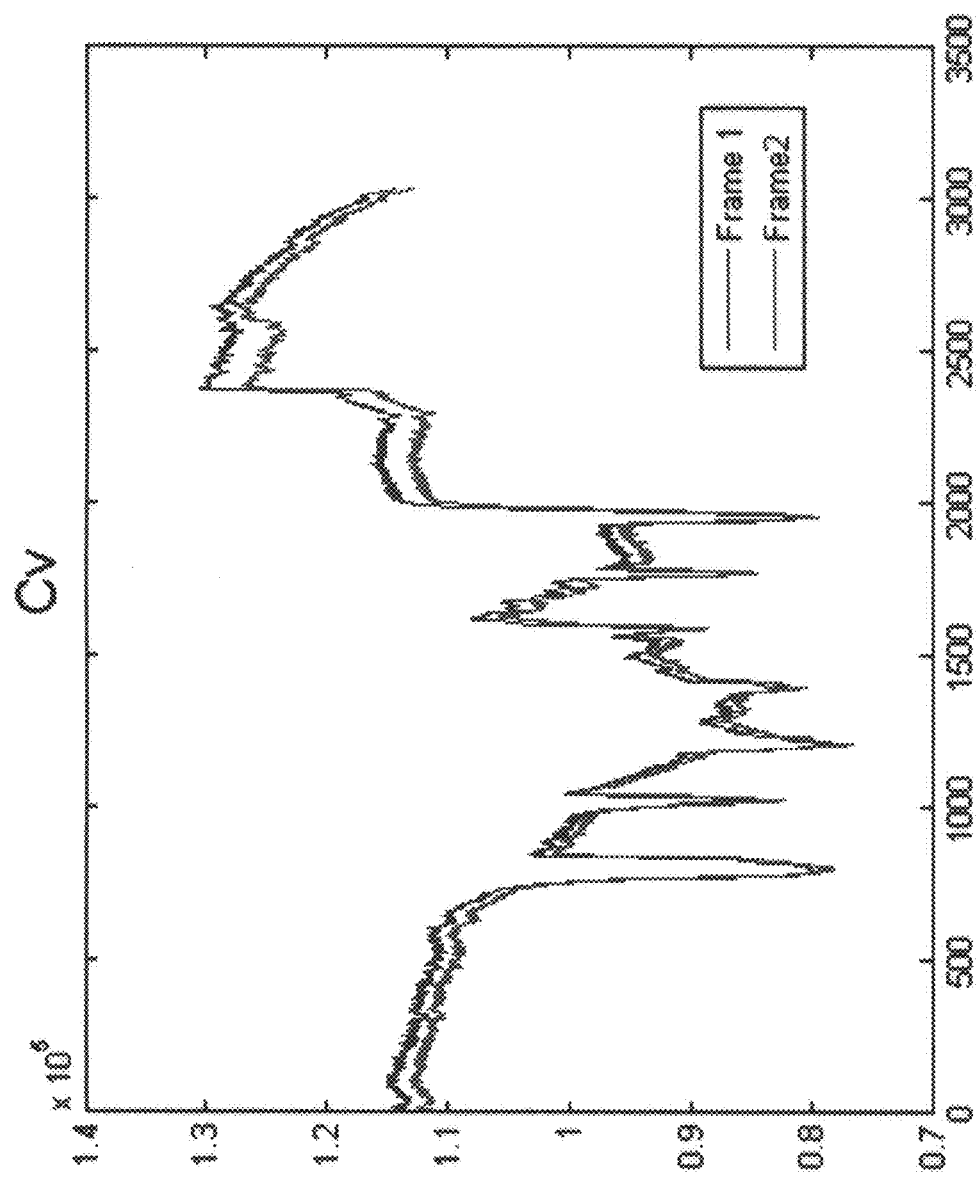
FIG. 11 illustrates two vertical characteristic curves, with an offset along the x-axis corresponding to vertical shift between frames.

The meaning of the curves can be easily understood by referring to the drawing of FIG. 9, where two schematic characteristic curves are shown. FIG. 10 and FIG. 11 show Ch and Cv curves for two successive frames. A shift of the curves along the x-axis represents an equivalent shift of the frames in the horizontal dimension (similar approach for y-axis and vertical shift). From the FIG. 10 and FIG. 11 the horizontal shift is particularly evident. The curves appear to be shifted also along the y-axis, maybe due to slightly changing lighting conditions. Hence, to evaluate the motion occurred between consecutive frames, the shift along the x-axis of both $C_h$ and $C_v$ curves may be obtained as in the following formula:

$$P_h(s) = \frac{1}{M - |s|} \sum_{j=max(1,-s)}^{min(M-s,M)} |C_h^{F1}(j) - C_h^{F2}(j+s)| \qquad (13)$$

$$off_h = \{s' : P_h(s') = \min P_h(s)\}$$

$$P_v(s) = \frac{1}{N - |s|} \sum_{i=max(1,-s)}^{min(N-s,N)} |C_h^{F1}(i) - C_h^{F2}(i+s)|$$

$$off_v = \{s' : P_v(s') = \min P_v(s)\}$$

5.3 Motion Estimation on Bayer Pattern

In an embodiment, applied on Bayer Pattern data, characteristics curves are computed only on green pixels, using the same extraction check board pattern scheme of FIG. 5. To maintain the Bayer pattern consistency (i.e., the GR BG or similar configuration), the estimated horizontal and vertical offsets may be forced to be a multiple of 2. Experimental results reveal that Motion estimation on Bayer Pattern is pretty accurate, comparing results to RGB Motion estimation, with difference of [−1,+1], due to the above indicated consistency.

Figure 12:
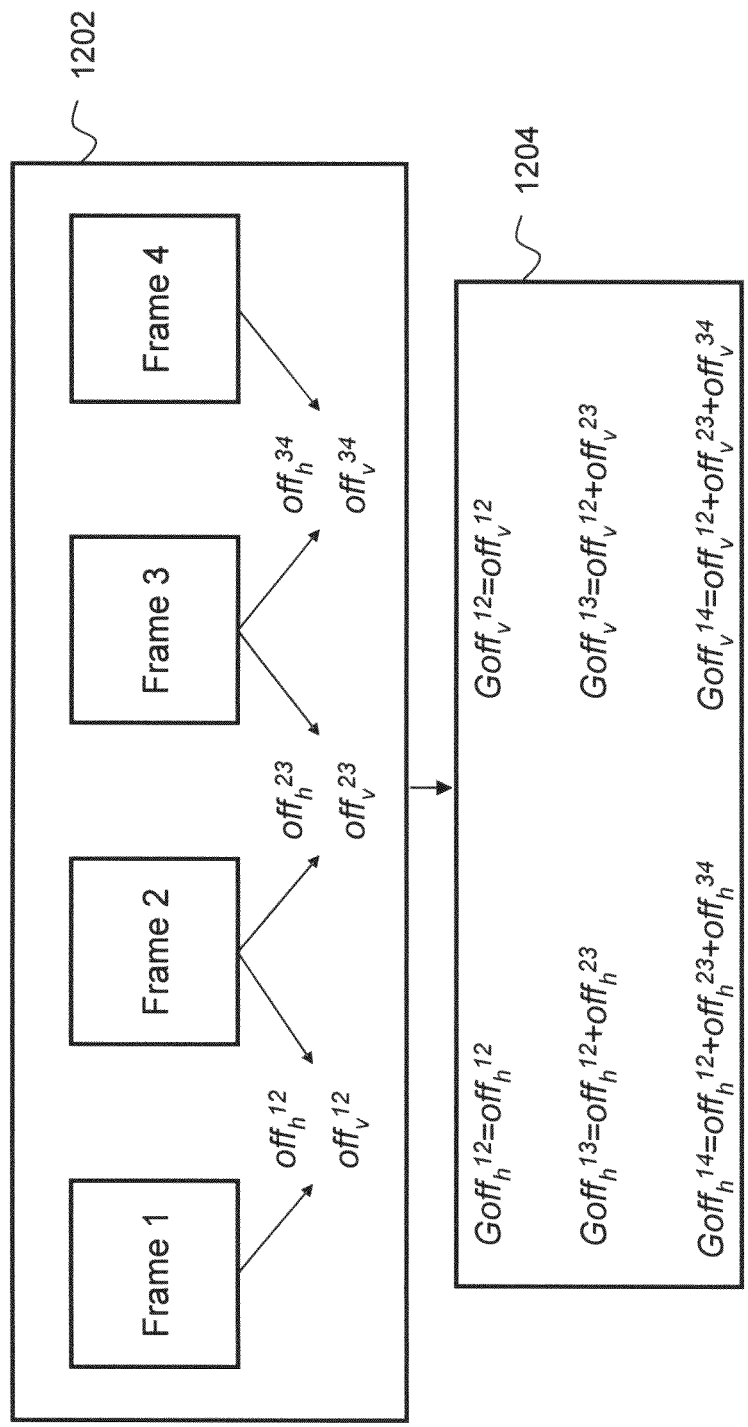
FIG. 12 illustrates an embodiment of a method of generating absolute global motion vectors.

For example, in the case in which 4 frames are used and the inputs are to be aligned with reference to the first one, a relative method, shown in FIG. 12, may be used. In this scheme, the relative global motion vector between two successive frames is obtained at 1202 and used to obtain global motion vectors at 1204. In an embodiment, the best results may be obtained by aligning the different frames with respect to the reference (first) frame, in order to compensate the small movements introduced between successive handheld captures.

A visual result of an embodiment of using motion estimation for stabilization is shown in FIG. 13.

5.3.1 Motion Estimation with RCF

An embodiment of a motion estimation method may be defined in the following equation (14), where max_s is the maximum allowed shift:

$$P_h(s) = \sum_{j=max\_s}^{M-max\_s} |RCF_v^{F1}(j) - RCF_v^{F2}(j+s)| \qquad (14)$$

$$off_h = \{s' : P_h(s') = \min P_h(s)\}$$

$$P_v(s) = \sum_{i=max\_s}^{N-max\_s} |RCF_h^{F1}(i) - RCF_h^{F2}(i+s)|$$

$$off_v = \{s' : P_v(s') = \min P_v(s)\}$$

where the parameter RCF for the frame F in horizontal and vertical direction is defined as follows:

$$RCF_h^F(j) = \sum_{i=1}^m p_{ij} \qquad (15)$$

$$RCF_v^F(i) = \sum_{j=1}^n p_{ij}$$

This embodiment avoids having different numbers of elements to test for the matching at the beginning and at the end of the curve.

5.3.2 Hardware

Figure 38:
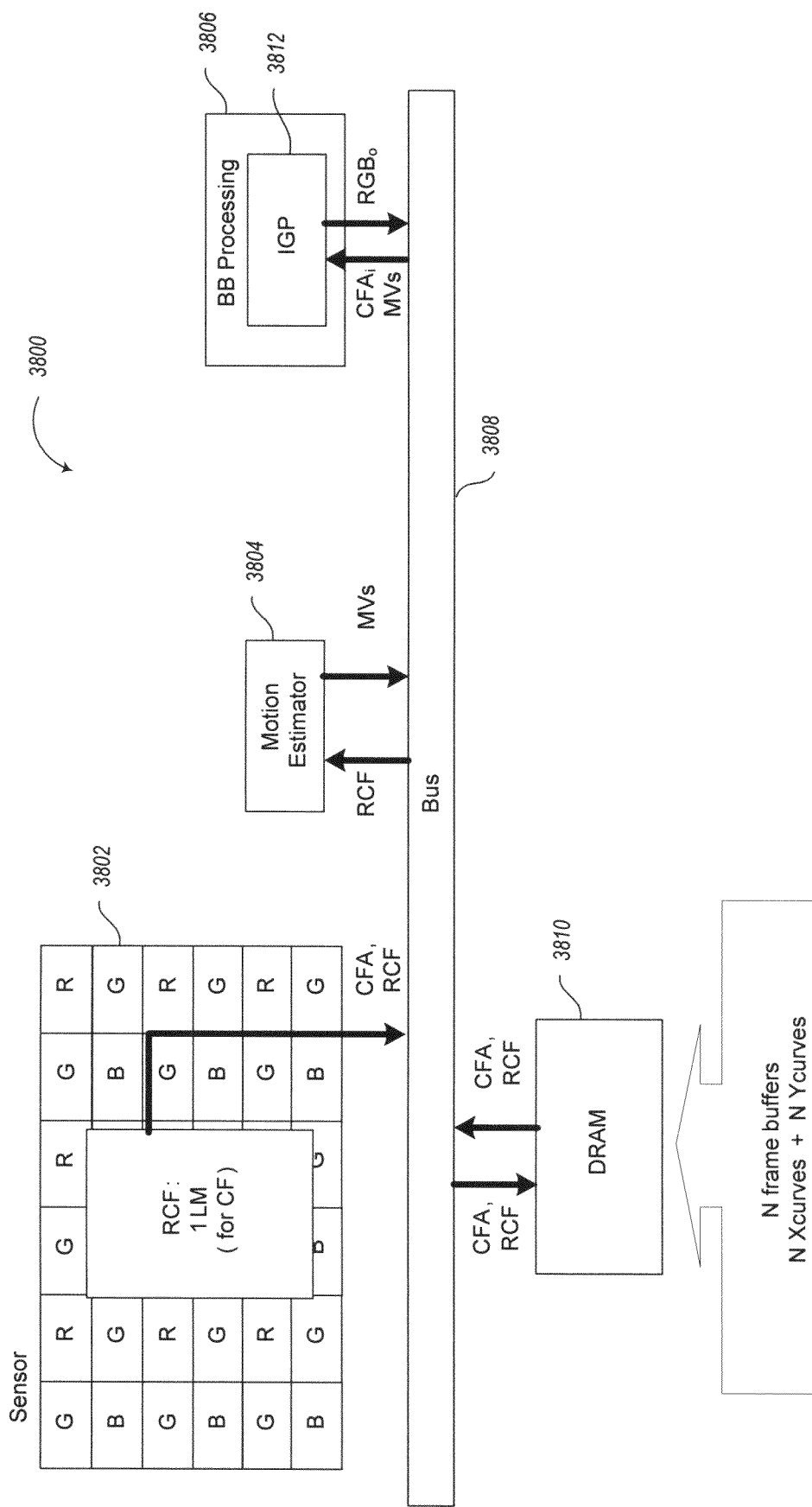
FIG. 38 is a functional block diagram of an embodiment of a system configured to estimate motion by processing green pixels of Bayer patterns, integrated with the sensor.

A block scheme of an embodiment of a system 3800 configured to estimate motion using green pixels of Bayer patterns is depicted in FIG. 38. The meaning of the blocks and the signals illustrated in FIG. 38 is reported in the following table:

| | |
|---|---|
| RCF | rows/columns feature content |
| 1LM | One Line Memory |
| BP Processing | Pipeline for processing Bayer pattern images |
| IGP | Image Generation Pipeline |
| CFA | input frame in Bayer format |
| RGBo | Interpolated output frame in the RGB domain |
| MVs | Motion Vectors |

A sensor 3802 is configured to perform raster processing and provides rows/columns feature content curves RCF (X and Y curves) and input frames CFA in Bayer format. The sensor 3802 is coupled to a bus system 3808. A memory DRAM 3810 is coupled to the bus system 3808 and configured to store N CFA input frames, N RCF X curves and N RCF Y curves. A motion estimator 3804 is coupled to the bus system 3808 and configured to generate motion vectors MV based on RCF curves. A digital image processor 3806, which as illustrated is configured to perform Bayer imaging processing, is coupled to the bus system 3808. The image processor 3806 comprises an image generation pipeline 3812.

Figure 39:
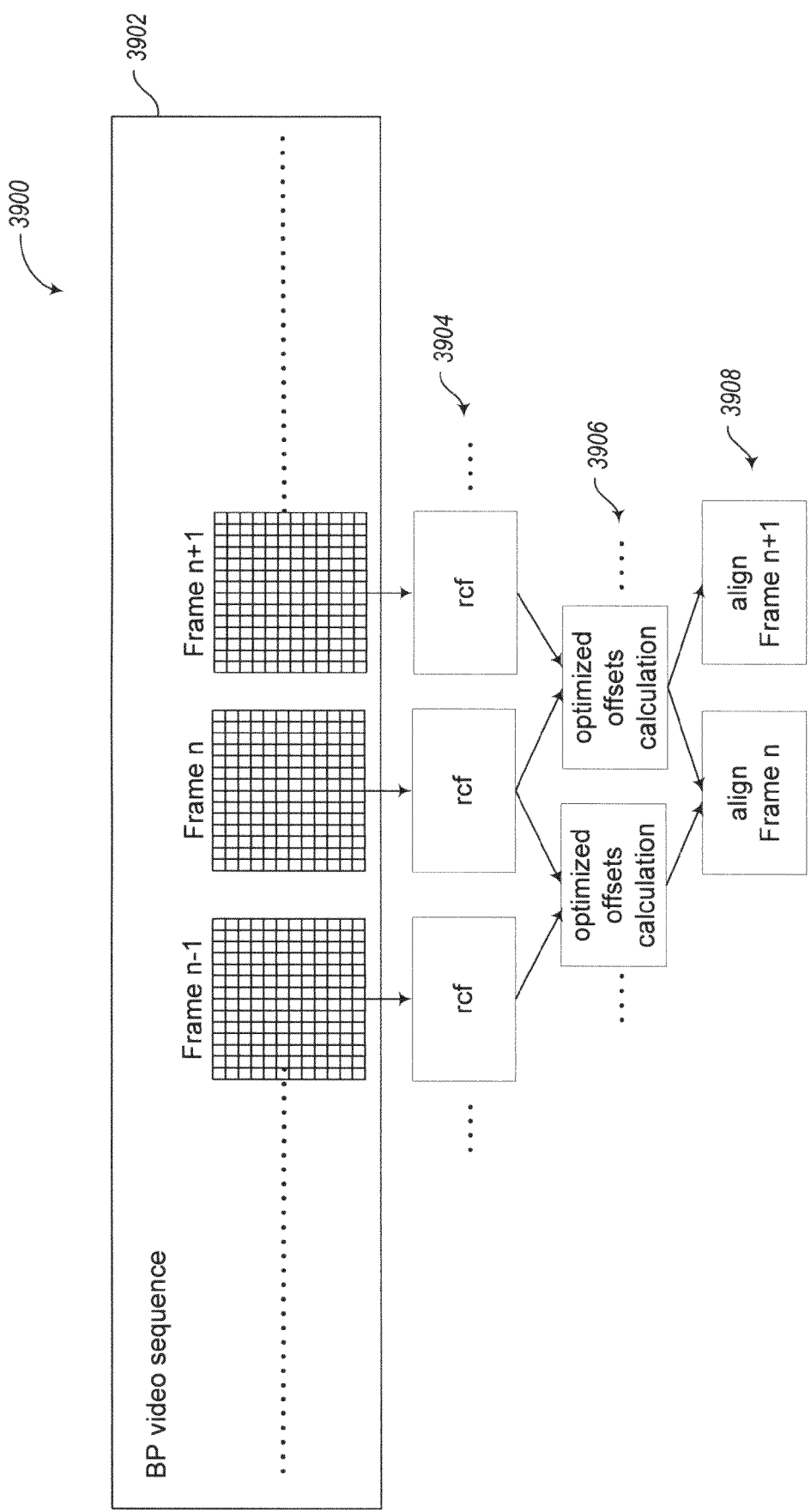
FIG. 39 is a flow chart illustrating an embodiment of a method for estimating motion by processing green pixels of Bayer patterns.

An embodiment of a method 3900 that may be performed by, for example, the system of FIG. 38 is illustrated in FIG. 39. A sequence of input Bayer (BP) images (FRAME N-1, FRAME N, FRAME N+1) is input 3902, for example a sequence of input images may be provided by the sensor 3802. The parameter RCF (See Equation 15) is calculated for each frame (in both horizontal and vertical) at 3904. This may be done, for example, by the sensor 3802 or the motion estimator 3804, and may be done under the control of a processor, such as processor 3806 or another processor, such as one incorporated into the sensor 3802, or under the control of a central system processor (not shown). At 3906, the parameters RCF are used to calculate offsets between images for aligning them together. This may be done, for example, by the motion estimator. At 3908, motion estimation vectors are calculated between the so aligned images. This may be done, for example, by the motion estimator 3804.

Figure 40:
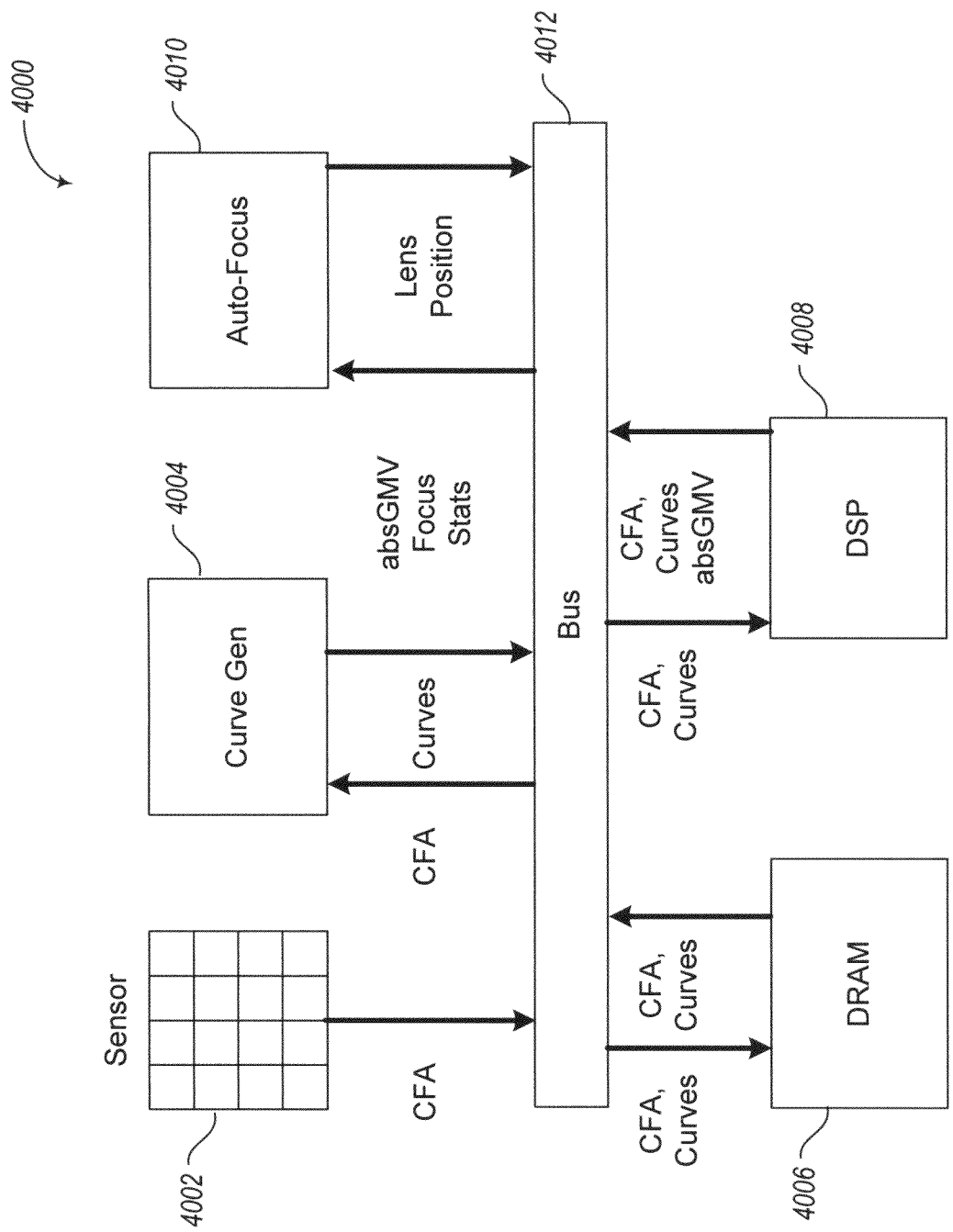
FIG. 40 is a functional block diagram of an embodiment of an auto-focusing system configured to estimate motion by processing pixels of Bayer patterns.
Figure 41:
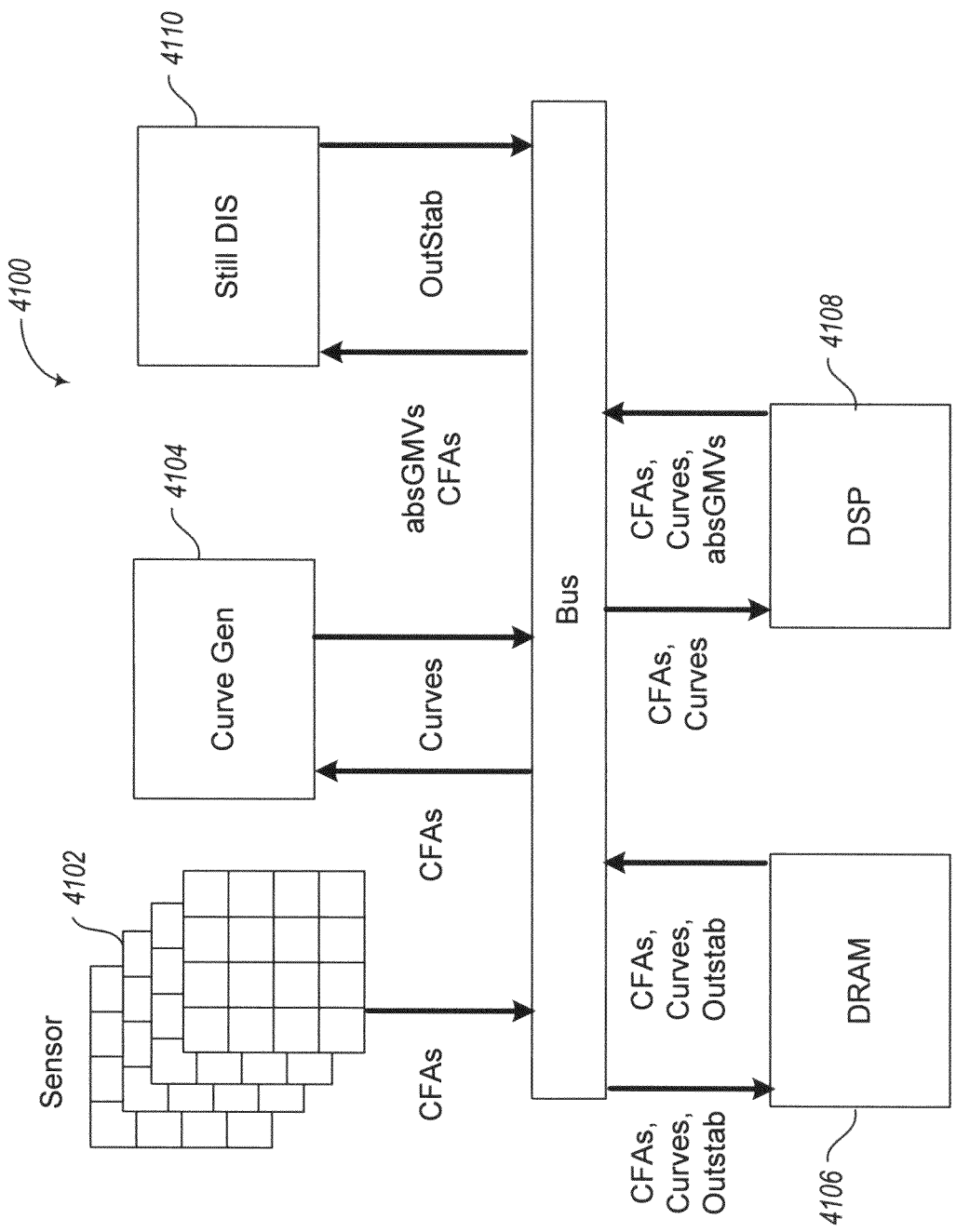
FIG. 41 is a functional block diagram of a still-video digital image stabilization device configured to estimate motion by processing pixels of Bayer patterns.

Embodiments of the systems and methods described herein, such as the embodiments depicted in block diagrams of FIGS. 4, 38, 40-43, may be implemented in a dedicated hardware or be integrated in other digital image processing systems, such as in an auto-focus system as depicted in FIG. 40, or in a still-video digital image stabilization device as depicted in FIG. 41. The meaning of the blocks and of the signals of the embodiments depicted in FIGS. 40 and 41 is reported in the following table:

| | |
|---|---|
| Curve Gen | Block configured to generate the curves defined in eq. (12) |
| CFA | input frame in Bayer format |
| Curves | Horizontal and vertical curves defined in eq. (12) |
| absGMV | absolute Global Motion Vector |
| Lens Position | Output lens position |
| Focus Stats | Focus Statistics |
| Sensor | Image sensor |
| OutStab | Output stabilized frame |

FIG. 40 illustrates an embodiment of an auto-focus system 4000. The system 4000 comprises an image sensor 4002 configured to generate input frames, for example, in Bayer format, a curve generator block 4004 configured to generate RCF X curves and RCF Y curves based on the CFA frames, a memory 4006 configured to store CFA frames, RCF X curves and RCF Y curves, a digital signal processor 4008 which may be configured to receive CFA frames, RCF X curves and RCF Y curves and to output CFA frames, RCF X curves, RCF Y curves and absolute Global Motion Vectors absGMV and to generate control signals, such as signals to control the curve generator, an auto-focus block 4010 configured to generate lens position control signals based on the motion vectors and focus statistics (which may, for example, be generated by the sensor or retrieved from the memory or combinations thereof), and a bus system 4012 configured to couple the system components together.

FIG. 41 illustrates an embodiment of a still-video digital image stabilization system 4100. The system 4100 comprises an image sensor 4102 configured to generate input frames, for example, in Bayer format, a curve generator block 4104 configured to generate RCF X curves and RCF Y curves based on the CFA frames, a memory 4106 configured to store CFA frames, RCF X curves and RCF Y curves, a digital signal processor 4108 which may be configured to receive CFA frames, RCF X curves and RCF Y curves and to output CFA frames, RCF X curves, RCF Y curves and absolute Global Motion Vectors absGMV and to generate control signals, such as signals to control the curve generator, a digital image stabilization block 4110 configured to generate a stabilized output frame based on the motion vectors and CFA frames, and a bus system 4112 configured to couple the system components together.

Figure 42:
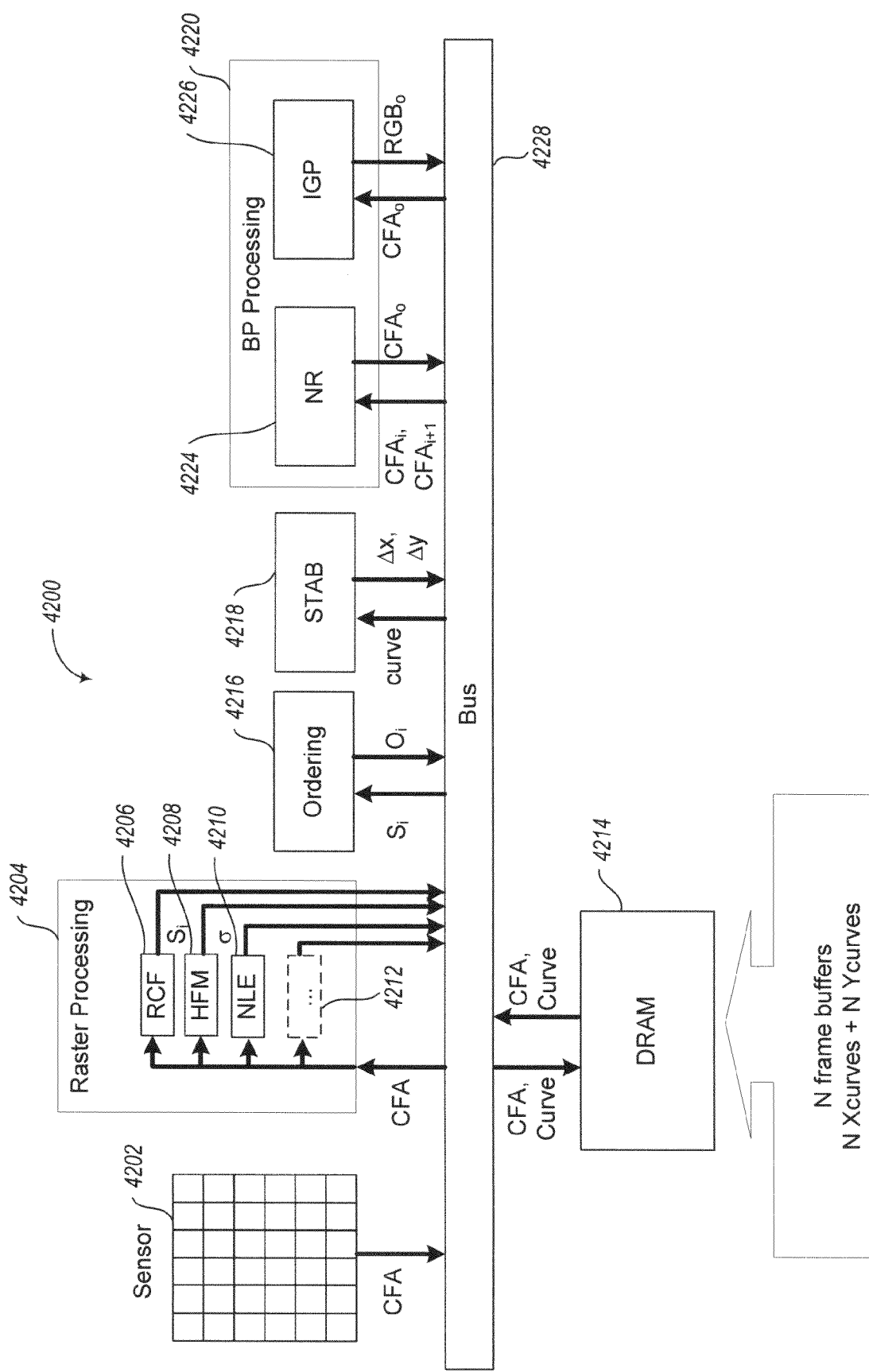
FIGS. 42 and 43 are functional block diagrams of embodiments of systems for processing digital images
Figure 43:
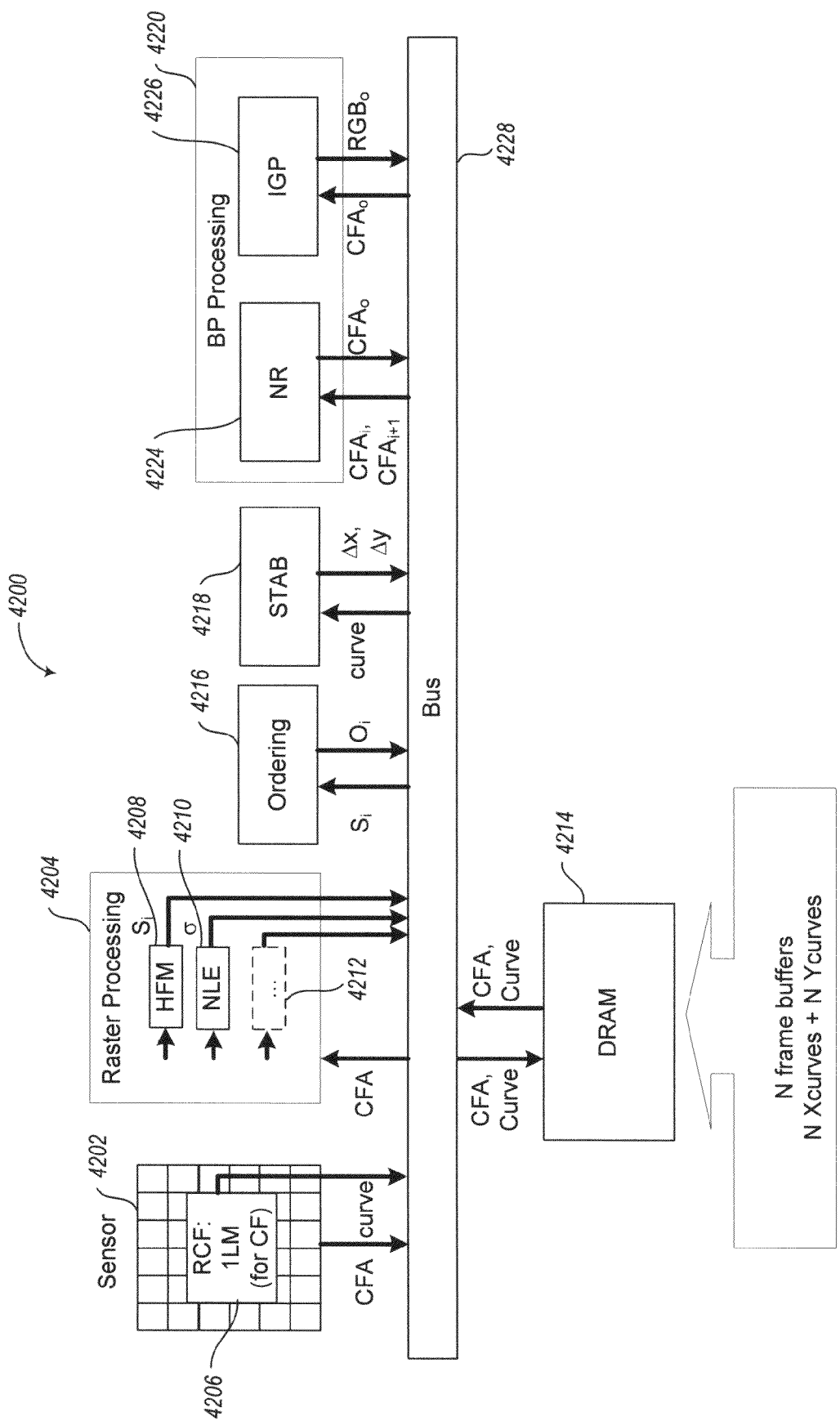

Detailed schemes of hardware embodiments configured to implement the methods described in Chapters 1, 2 and 5 are depicted in FIGS. 42 and 43. The meaning of the blocks and of the signals depicted in FIGS. 42 and 43 is reported in the following table:

| | |
|---|---|
| Sensor | Image sensor |
| Curve | Horizontal and vertical curves defined in eq. (12) |
| CFAi | input frame in Bayer format |
| CFAo | output frame in Bayer format |
| RGBo | interpolated output frame in the RGB domain |
| IGP | Image Generation Pipeline |
| BP Processing | Pipeline for processing Bayer pattern images |
| Ordering | Block for ordering images according to their sharpness indicator |
| STAB | Stabilizer |
| NR | Noise reducing block |
| HFM | block for measuring sharpness |
| NLE | noise level estimator |
| RCF | block for calculating the curves defined in eq. (12) |
| σ | rms of noise |
| Δx, Δy | Offsets |
| Si | sharpness parameter of the i-th frame |
| Oi | Order number of the i-th frame |

FIG. 42 illustrates an embodiment of a digital image processing system 4200. FIG. 43 illustrates another embodiment of a digital image processing system 4300. The system 4200 in FIG. 42 comprises: an image sensor 4202 configured to generate input frames CFA, for example, in Bayer format; a raster processing block 4204 configured to receive CFA input frames and having an RFC block 4206 configured to generate RCF X curves and RCF Y values based on the CFA frames, a sharpness or HFM block 4208 configured to measure sharpness of received CFA images, an Noise Level Estimator (NLE) block 4210, and additional blocks 4212 to perform other desired processing; a memory 4214 configured to store CFA frames, RCF X curves and RCF Y curves; an ordering block 4216 configured to order received CFA frames based on measured sharpness; a digital image stabilization block 4218 configured to generate a stabilizing offsets based on RCF curves; a Bayer image processor 4220 configured to output sequences of interpolated RGB output frames and having a noise reduction block 4224 configured to reduce image noise (for example, the noise reduction block may be configured to use any of the noise reduction techniques discussed herein) and an image generation pipeline 4226 configured to generate the output sequences; and a bus system 4228 configured to couple the system components together. A difference between the system 4200 of FIG. 42 and the system 4300 of FIG. 43 is that in the latter embodiment the image sensor 4202 comprises an RCF block 4206, instead of the rastor processing block 4204 having an RCF block 4206.

5.3.3 Motion Estimation with Fast Search

Figure 44:
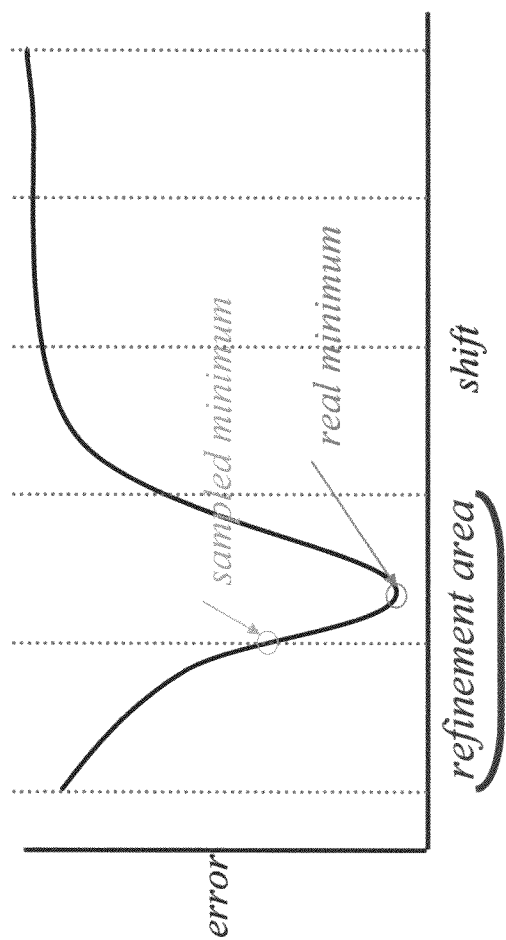
FIG. 44 illustrates an embodiment of a method of searching for a global minimum in a integral projection curve.

Usually there is just one global minimum on curves obtained with an Integral Projection algorithm. After dividing the interval of search in parts N, the real minimum of the curve can be searched around the sampled minimum, reducing drastically the number of steps needed in the search, as indicated in FIG. 44.

Considering a search window SW, an embodiment of a fast search method comprises the following number of steps Fast, with N chosen opportunely to minimize the steps:

$$\text{Fast} = POW(2, N+1) + (SW/POW(2, N-1)) - 1 \qquad (16)$$

wherein $POW(2, N) = 2^N$.

The optimal N, as reported in Table 12, is:

$$N = \begin{cases} 2 \text{ for } 8 \leq SW \leq 32 \\ 3 \text{ for } 32 < SW \leq 128 \end{cases} \quad (17)$$

Using an embodiment of a fast search method, a reduction of number of operations of about:
17.64% for SW=8;
45.45% for SW=16;
60.00% for SW=32;
73.64% for SW=64;
80.54% for SW=12;
may be obtained in respect to a typical full search.

TABLE 12

Calculation of the best N, depending on the search window.

| Search Window (−SW:+SW) | FULL SEARCH | FAST SEARCH | | | | |
|---|---|---|---|---|---|---|
| | | STEP = SW/2 (N = 1) | STEP = SW/4 (N = 2) | STEP = SW/8 (N = 3) | STEP = SW/16 (N = 4) | STEP = SW/32 (N = 5) |
| 8 | 17 | 11 | 11 | 17 | — | — |
| 16 | 33 | 19 | 15 | 19 | 33 | — |
| 32 | 65 | 35 | 23 | 23 | 35 | 65 |
| 64 | 129 | 63 | 39 | 31 | 39 | 63 |
| 128 | 257 | 131 | 71 | 47 | 47 | 71 |

5.4. Computational Improvement

Table 13 summarizes the operation counts for the prior art and an embodiment of the proposed fast method, considering the various optimization steps, with an input Bayer Pattern image of size (W×H) and a search window for the Motion estimation of SW pixels. In this Table 13, Full indicates full search steps, that is Full=(SW·2)+1, Fast indicates fast search steps, that is Fast=POW(2,N+1)+(SW/POW(2,N−1))−1.

Table 14 reports results obtained for the sensor ST 850, considering an input Bayer Pattern image of size (W×H)= (2056×1544) and a search window for the Motion estimation of SW=32 pixels, with a margin loss in Motion estimation of about 7%. Looking at Table 12, the optimal value for N is 3 or 4, thus in Table 12 Full=65, Fast=23. The overall improvement in terms of number of operations using the proposed method is about 51.83%.

TABLE 14

| | Practical Test Example | | | |
|---|---|---|---|---|
| op. per pixel | Add | Mul | Div | Comp |
| RGB | 2 + 0.294852 + 0.000409 | 0 | 0.000409 | 0.147426 + 0.000409 |
| Bayer | 1 + 0.294852 + 0.000409 | 0 | 0.000409 | 0.147426 + 0.000409 |
| No Div (Bayer) | 1 + 0.294852 + 0 | 0 | | 0.147426 + 0 |
| No Div + Fast Search (Bayer) | 1 + 0.117941 | 0 | | 0.058970 |

An embodiment of a motion estimation technique processes Bayer pattern images, thus it can be easily added, as a pre-processing step, before any typical Image Generation Pipeline. It may also be applied on YUV or RGB images as a post-processing step. Moreover, it is low cost and low power demanding, thus it can be easily used for real-time processing.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

TABLE 13

Operation count for different Motion estimation algorithms.

| op. per pixel | Add | Mul | Div | Comp |
|---|---|---|---|---|
| RGB | 2 + 4 · Full · ((W + H)/(W · H)) + 2 · ((Full)/(W · H)) | 0 | 2 · ((Full)/(W · H)) | 2 · Full · ((W + H)/(W · H)) + 2 · ((Full)/(W · H)) |
| Bayer | 1 + 4 · Full · ((W + H)/(W · H)) + 2 · ((Full)/(W · H)) | 0 | 2 · ((Full)/(W · H)) | 2 · Full · ((W + H)/(W · H)) + 2 · ((Full)/(W · H)) |
| No Div (Bayer) | 1 + 4 · Full · ((W + H)/(W · H)) + 0 | 0 | | 2 · Full · ((W + H)/(W · H)) + 0 |
| No Div + Fast Search (Bayer) | 1 + 4 · Fast · ((W + H)/(W · H)) | 0 | | 2 · Fast · ((W + H)/(W · H)) |

For instance, the foregoing detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   merging a number of two or more images N of a same scene into an output image in an image processing system, by,
   determining an order of sharpness among the N images, the determining including identifying a sharpest image in the N images;
   determining vertical and horizontal offsets with respect to the sharpest image in the N images for other images in the N images and generating corresponding offset-free images;
   generating pixels of an intermediate image by combining corresponding pixels of the sharpest image and the offset-free images, the generating pixels of the intermediate image including calculating a weight of a pixel of an offset-free image based on a calculated standard deviation of noise and an absolute value of a difference between an intensity of the pixel and of a respective pixel of the sharpest image; and
   filtering noise from the intermediate image to generate the output image, the determining, generating and filtering being performed by one or more configured devices of the image processing system.

2. The method of claim 1 wherein generating pixels of the intermediate image comprises computing a weighted average by assigning larger weights for sharper images and smaller weights for less sharp images.

3. The method of claim 1 wherein generating pixels of the intermediate image comprises:
   calculating the standard deviation of noise by processing pixels of a set of the N images;
   for each pixel of the offset-free images, calculating a respective weight in function of the standard deviation and in function of an absolute value of a difference between an intensity of the pixel and of a respective pixel of the sharpest image; and
   generating each pixel of the intermediate image as a weighted average with the weights of the corresponding pixels of the offset-free images.

4. The method of claim 3 wherein the set of the N images comprises each of the N images.

5. The method of claim 1 wherein generating pixels of the intermediate image comprises: performing temporal noise reduction iteratively applied in order starting from a sharpest offset-free image to a least sharp offset-free image.

6. The method of claim 1 wherein the images are Bayer images and the offsets are calculated considering only green pixels.

7. A method, comprising:
   generating an output image having a level of illumination corresponding to an exposure time T, by,
   taking a plurality of N images of a same scene over an exposure time T/N;
   amplifying a luminance of each of the images up to the level of illumination;

determining an order of sharpness among the N images, the determining including identifying a sharpest image in the N images;

determining vertical and horizontal offsets with respect to the sharpest image in the N images for other images in the N images and generating corresponding offset-free images;

generating pixels of an intermediate image by combining corresponding pixels of the sharpest image and the offset-free images, the generating pixels of the intermediate image including calculating a weight of a pixel of an offset-free image based on a calculated standard deviation of noise and an absolute value of a difference between an intensity of the pixel and of a respective pixel of the sharpest image; and filtering noise from the intermediate image to generate the output image, the determining, the generating and the filtering being performed by a configured image processing system.

8. The method of claim 7 wherein generating pixels of the intermediate image comprises computing a weighted average by assigning larger weights for sharper images and smaller weights for less sharp images.

9. The method of claim 7 wherein generating pixels of the intermediate image comprises:

calculating the standard deviation of noise by processing pixels of a set of the plurality of images;

for each pixel of the offset-free images, calculating a respective weight in function of the standard deviation and in function of an absolute value of a difference between an intensity of the pixel and of a respective pixel of the sharpest image; and generating each pixel of the intermediate image as a weighted average with the weights of the corresponding pixels of the offset-free images.

10. The method of claim 7 wherein generating pixels of the intermediate image comprises: performing temporal noise reduction iteratively applied in order starting from a sharpest offset-free image to a least sharp offset-free image.

11. The method of claim 7 wherein the images are Bayer images and the offsets are calculated considering only green pixels.

12. A device to process a set of two or more images of a scene, comprising:

a sensor configured to generate the set of images of the scene;

a memory configured to store the set of images and respective characteristic curves;

a raster processing block configured to generate respective signals representing a noise rms value and a sharpness parameter for each image in the set;

an ordering block configured to assign an order to each image in the set based on the sharpness parameters, the ordering indicating a sharpest image in the set of images;

a stabilization block configured to generate signals representing horizontal and vertical offsets for images with respect to the sharpest image in the set based on characteristic curves; and an image processing pipeline having a noise reduction block configured to generate an output image filtered from noise, and an image generation block configured to generate an RGB image corresponding to the set of images, wherein the image processing pipeline is configured to assign a pixel weight based on a noise rms value and on an absolute value of a difference between an intensity of the pixel and of a respective pixel of the sharpest image.

13. The device of claim 12 wherein the images are Bayer images.

14. A system to process a set of two or more digital images, comprising:

a sharpness block configured to determine a sharpest image in the set of images;

an image stabilization block configured to compensate for motion in the set of images using the sharpest image in the set of images as a reference by determining vertical and horizontal offsets with respect to the sharpest image for other images in the set of images and generating corresponding offset-free images; and an image processing block configured to:

generate pixels of an intermediate image by combining corresponding pixels of the sharpest image and the offset-free images, the generating pixels of the intermediate image including calculating a weight of a pixel of an offset-free image based on a calculated standard deviation of noise and on an absolute value of a difference between an intensity of the pixel and of a respective pixel of the sharpest image; and reduce noise in an output image generated from the set of images.

15. The system of claim 14, further comprising an image sensor configured to generate the set of images.

16. The system of claim 14 wherein the sharpness block is configured to order the set of images in decreasing order of sharpness.

17. The system of claim 14, further comprising a curve generator configured to generate characteristic curves for images in the set of images, wherein the stabilization block is configured to compensate for the motion based on the characteristic curves.

18. The system of claim 14, wherein the images are Bayer images.

19. A non-transitory computer readable memory medium comprising contents that cause a computing device to implement a method of merging a plurality of N images into a single output image, the method including:

determining an order of sharpness among the N images, the determining identifying a sharpest image among the N images;

determining vertical and horizontal offsets with respect to the sharpest image in the N images for other images in the N images and generating corresponding offset-free images;

generating pixels of an intermediate image by combining corresponding pixels of the sharpest image and the offset-free images, the generating pixels of the intermediate image including calculating a weight of a pixel of an offset-free image based on a calculated standard deviation of noise and on an absolute value of a difference between an intensity of the pixel and of a respective pixel of the sharpest image; and filtering noise from the intermediate image to generate the output image.

20. The non-transitory computer readable memory medium of claim 19, wherein the method further comprises:

generating the N images by taking a plurality of N images of a same scene; and amplifying a luminance of each of the images N up to a level of illumination.

* * * * *